(12) United States Patent
Lin et al.

(10) Patent No.: US 11,419,106 B2
(45) Date of Patent: *Aug. 16, 2022

(54) COMMUNICATION METHOD, BASE STATION, RADIO COMMUNICATION NODE, AND USER EQUIPMENT

(71) Applicant: HUAWEI TECHNOLOGIES CO., LTD., Shenzhen (CN)

(72) Inventors: Bo Lin, Beijing (CN); Hao Bi, Rolling Meadows, IL (US); Yongxing Zhou, Beijing (CN); Yu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

This patent is subject to a terminal disclaimer.

(21) Appl. No.: 16/989,616

(22) Filed: Aug. 10, 2020

(65) Prior Publication Data

US 2021/0029686 A1 Jan. 28, 2021

Related U.S. Application Data

(63) Continuation of application No. 16/169,602, filed on Oct. 24, 2018, now Pat. No. 10,764,887, which is a
(Continued)

(51) Int. Cl.
*H04W 72/04* (2009.01)
*H04L 5/00* (2006.01)
(Continued)

(52) U.S. Cl.
CPC ......... *H04W 72/044* (2013.01); *H04L 5/0035* (2013.01); *H04W 16/02* (2013.01);
(Continued)

(58) Field of Classification Search
CPC ........... H04W 72/044; H04W 72/0406; H04W 72/0466; H04W 74/002; H04W 74/006;
(Continued)

(56) References Cited

U.S. PATENT DOCUMENTS 5,883,884 A 3/1999 Atkinson
8,509,798 B2 8/2013 Lin et al.
(Continued)

FOREIGN PATENT DOCUMENTS

CN 102006601 A 4/2011
CN 102036291 4/2011
(Continued)

OTHER PUBLICATIONS

Office Action issued in Chinese Application No. 201810301866.4 dated Mar. 1, 2021, 15 pages.
(Continued)

*Primary Examiner* — Warner Wong
(74) *Attorney, Agent, or Firm* — Fish & Richardson P.C.

(57) ABSTRACT

A communication method, a base station, a radio communication node, and a user equipment are provided. A base station determines first resource configuration information, where the first resource configuration information is used for indicating N radio resource sets that are used when N radio communication nodes separately perform communication with a user equipment UE, and the radio resource includes a time domain resource and/or a frequency domain resource. The base station sends the first resource configuration information to the UE, where the UE communicates with a corresponding transmission point by using respective radio resource sets of transmission points, and the respective radio resource sets of the transmission points do not intersect. Therefore, a base station does not need to schedule a radio
(Continued)

resource, thereby lowering a delay requirement on a backhaul link and eliminating interference.

21 Claims, 13 Drawing Sheets

Related U.S. Application Data continuation of application No. 15/589,414, filed on May 8, 2017, now Pat. No. 10,129,868, which is a continuation of application No. 14/656,995, filed on Mar. 13, 2015, now Pat. No. 9,674,831, which is a continuation of application No. PCT/CN2012/081336, filed on Sep. 13, 2012.

(51) Int. Cl.
*H04W 74/00* (2009.01)
*H04W 16/02* (2009.01)
*H04W 24/08* (2009.01)

(52) U.S. Cl.
CPC ....... *H04W 24/08* (2013.01); *H04W 72/0406* (2013.01); *H04W 72/0466* (2013.01); *H04W 74/002* (2013.01); *H04W 74/006* (2013.01)

(58) Field of Classification Search
CPC ............... H04W 76/025; H04L 5/0035; H04L 2012/5643
See application file for complete search history.

(56) References Cited

U.S. PATENT DOCUMENTS

| | | | |
|---|---|---|---|
| 9,247,479 | B2 | 1/2016 | Balercia et al. |
| 2007/0127359 | A1* | 6/2007 | Ahn ....................... H04L 5/023 370/208 |
| 2008/0090585 | A1 | 4/2008 | Hart et al. |
| 2009/0181694 | A1 | 7/2009 | Byun et al. |
| 2010/0110968 | A1 | 5/2010 | Lee et al. |
| 2010/0255854 | A1 | 10/2010 | Lee et al. |
| 2010/0260088 | A1 | 10/2010 | Jeon |
| 2010/0296401 | A1 | 11/2010 | Karaoguz et al. |
| 2011/0002256 | A1 | 1/2011 | Chien et al. |
| 2011/0188398 | A1 | 8/2011 | Baba et al. |
| 2011/0235603 | A1 | 9/2011 | Cheng et al. |
| 2011/0292906 | A1 | 12/2011 | Ren et al. |
| 2011/0317610 | A1 | 12/2011 | Park et al. |
| 2012/0076071 | A1 | 3/2012 | Kim et al. |
| 2012/0147794 | A1 | 6/2012 | Chung et al. |
| 2012/0157131 | A1 | 6/2012 | Chang et al. |
| 2012/0188953 | A1 | 7/2012 | Won et al. |
| 2012/0238202 | A1 | 9/2012 | Kim et al. |
| 2013/0223257 | A1 | 8/2013 | Balercia et al. |
| 2014/0169322 | A1* | 6/2014 | Ouchi ................. H04W 72/042 370/329 |
| 2015/0341949 | A1* | 11/2015 | Nagata ................. H04L 1/0013 370/329 |
| 2017/0149490 | A1 | 5/2017 | Sfar et al. |

FOREIGN PATENT DOCUMENTS

| | | |
|---|---|---|
| CN | 102056264 | 5/2011 |
| CN | 102342035 | 2/2012 |
| CN | 103843432 B | 4/2018 |
| EP | 2323278 | 5/2011 |
| WO | WO 2010/091545 | 8/2010 |
| WO | WO 2010/143868 | 12/2010 |
| WO | WO 2011/059199 | 5/2011 |
| WO | WO 2011/132945 | 10/2011 |
| WO | WO 2012/028641 | 3/2012 |

OTHER PUBLICATIONS

3rd Generation Partnership Project; Technical Specification Group Radio Access Network; High Speed Packet Access (HSDPA) multipoint transmission (Release 11), 3GPP TR 25.872 v11.0.0, Sep. 2011, 29 pages.
3GPP TSG-RAN WG1 #64 R1-110649, "Aspects on Distributed RR Us with Shared Cell-ID for Heterogeneous Deployments", Ericsson, ST-Ericsson,Feb. 21-Feb. 25, 2011, total 11 pages.
Extended European Search Report issued in 17201531.5 dated Apr. 17, 2018, 6 pages.
Extended European Search Report issued in European Application No. 12884727.4 dated Oct. 16, 2015; 6 pages.
International Search Report issued in International Application No. PCT/CN2012/081336 dated Jun. 20, 2013; 7 pages.
Office Action issued in Chinese Application No. 201280024113.4 dated Jun. 19, 2017; 22 pages.
Extended European Search Report issued in European Application No. 20176027.9 dated Sep. 21, 2020, 7 pages.

* cited by examiner

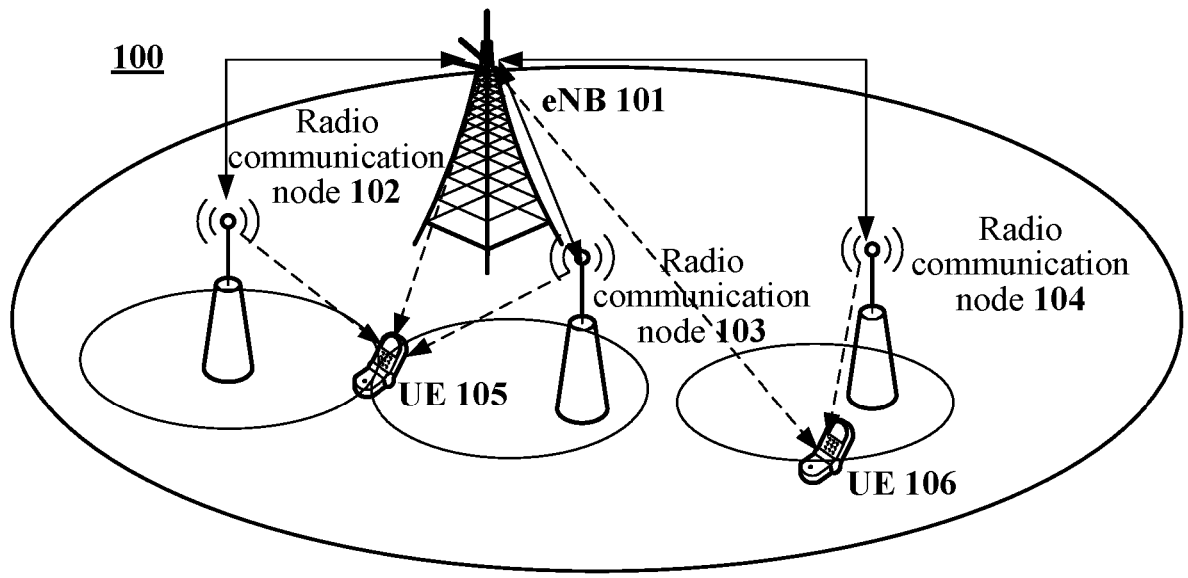

FIG. 1

| A base station determines first resource configuration information, where the first resource configuration information is used for indicating N radio resource sets which are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource | ⌒201 |

↓

| Send the first resource configuration information to the UE, so that the UE communicates with the corresponding radio communication node by using the radio resource in the N radio resource sets | ⌒202 |

FIG. 2

| A first radio communication node receives information that is about a second configuration parameter and is sent by an operations, administration and maintenance OAM device; or, a first radio communication node determines a second configuration parameter according to a first coordination request message received from a base station and sent by the base station, and sends information about the second configuration parameter to the base station, where the first coordination request message carries the information about the second configuration parameter configured by the base station for communication between the first radio communication node and the UE | 301 |

| The first radio communication node communicates with the UE by scheduling the radio resource in the first radio resource set | 302 |

FIG. 3

| A UE receives first resource configuration information sent by a base station, where the first resource configuration information is used for indicating N radio resource sets which are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource | 401 |

| The UE communicates with a corresponding transmission point by using a radio resource in respective radio resource sets of transmission points, where the respective radio resource sets of the transmission points do not intersect, the respective radio resource sets of the transmission points include the N radio resource sets, and the transmission points include the N radio communication nodes | 402 |

FIG. 4

A base station determines first resource configuration information, where the first resource configuration information is used for indicating N radio resource sets which are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource  ⟋901

The base station sends configuration information of corresponding radio resource sets among the N radio resource sets to the N radio communication nodes, respectively, so that the N radio communication nodes communicate with the UE by scheduling the radio resources in respective radio resource sets  ⟋902

FIG. 9

A first radio communication node receives information about a fourth configuration parameter sent by an operations, administration and maintenance OAM device; or, a first radio communication node determines a fourth configuration parameter according to a second coordination request message received from the base station, and sends information about the fourth configuration parameter to the base station, where the second coordination request message carries the information about the fourth configuration parameter configured by the base station for communication between the first radio communication node and the UE  ⟋1001

The first radio communication node schedules the radio resource in the first radio resource set to communicate with the UE  ⟋1002

FIG. 10

COMMUNICATION METHOD, BASE STATION, RADIO COMMUNICATION NODE, AND USER EQUIPMENT

CROSS-REFERENCE TO RELATED APPLICATIONS

This application is a continuation of U.S. patent application Ser. No. 16/169,602, filed on Oct. 24, 2018, which is a continuation of U.S. patent application Ser. No. 15/589,414, filed on May 8, 2017, now U.S. Pat. No. 10,129,868, which is a continuation of U.S. patent application Ser. No. 14/656, 995, filed on Mar. 13, 2015, now U.S. Pat. No. 9,674,831, which is a continuation of International Application No. PCT/CN2012/081336, filed on Sep. 13, 2012. All of the afore-mentioned patent applications are hereby incorporated by reference in their entireties.

TECHNICAL FIELD

Embodiments of the present disclosure relate to the field of communications technologies, and more specifically to a communication method and device.

BACKGROUND

To increase a throughput of a UE (user equipment), in a macro cell, a plurality of small stations may be introduced to form a small cell, and a small cell can cover a hotspot region or cover a hole region. In this way, when a UE moves to these regions covered by small cells, a service of the UE can be switched to these small cells to implement service offload or coverage compensation. These small stations may be small base stations, micro base stations, home base stations, RRHs (remote radio heads), or relay stations.

For example, in an existing CA (carrier aggregation) technology, an RRH is located under coverage (for example, a hotspot region) of a base station, and the RRH and the base station have different frequencies. A backhaul manner of an optical fiber connection is adopted between the RRH and the base station, and an optical fiber has characteristics such as a low delay and a large bandwidth. When a UE is under coverage of the RRH, the base station performs centralized scheduling, and the base station and the RRH transmit data to the UE at the same time in a carrier aggregation manner, thereby increasing a throughput of the UE.

In another example, in an existing CoMP (coordinated multiple points transmission) technology, an RRH is located under coverage (for example, a hotspot region) of a base station, and the RRH and the base station have a same frequency. A backhaul manner of an optical fiber connection is adopted between the RRH and the base station, and an optical fiber has characteristics such as a low delay and a large bandwidth. When a UE is under coverage of the RRH, the base station performs centralized scheduling, and the base station and the RRH coordinate to transmit data to the UE to increase a throughput of the UE.

In the foregoing existing mechanisms, the base station performs centralized scheduling and processing. Specifically, a protocol layer of the base station includes: a PDCP (packet data convergence protocol) layer, an RLC (radio link control) layer, a MAC (medium access control) layer, a Phy (physical) layer, and the like. The base station encapsulates a data packet and allocates a radio resource and then sends, through an optical fiber, the encapsulated data packet and the radio resource used by the RRH to the RRH. The rapid transmission of an optical fiber has almost a zero delay, guaranteeing that the RRH sends the encapsulated data packet to the UE on a radio interface based on an order that the base station schedules the RRH and the radio resource. Therefore, the UE is capable of decoding correctly, and confusion does not occur.

However, a backhaul link deployed with an optical fiber has high cost. For carriers who demand lower cost, a backhaul link deployed with an optical fiber is an excessively ideal network. In existing networks of many carriers, most are ordinary backhaul links, such as an Ethernet, an xDSL (digital subscriber line), or microwave. An ordinary backhaul link has a larger delay (for example, 10 ms to 20 ms) and a smaller bandwidth compared with an optical fiber backhaul link. If the CoMP or CA technology is adopted, data scheduled by a base station needs to be transmitted through a backhaul link to each RRH for subsequent transmission. As delays from the base station to RRHs are different, the base station practically cannot effectively control the moment of sending data, which might cause that data of two RRHs is transmitted on one same radio resource, resulting in strong interference and further a failure in implementing CoMP or CA. Also, for CoMP or CA, data that a base station transfers to an RRH through a backhaul link is modulated, encoded, and the like, and a size of data becomes larger, which occupies a larger bandwidth and forms a great challenge for an ordinary backhaul link.

Therefore, in an ordinary backhaul link, due to limits of delay and bandwidth for a backhaul link of a carrier, an RRH cannot be deployed to implement multiple points transmission. The problem to be solved by the present disclosure is how to implement multiple points transmission by lowering a delay requirement on a backhaul link based on an existing limited backhaul link.

SUMMARY

Embodiments of the present disclosure provide a communication method and device, so as to lower a delay requirement on a backhaul link.

According to a first aspect, a communication method is provided. The method includes: determining, by a base station, first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource; and sending the first resource configuration information to the UE, so that the UE communicates with the corresponding radio communication node by using the radio resource in the N radio resource sets; where, the UE communicates with a corresponding transmission point by using respective radio resource sets of transmission points, the respective radio resource sets of the transmission points do not intersect, the respective radio resource sets of the transmission points include the N radio resource sets, and the transmission points include the N radio communication nodes.

According to a second aspect, a communication method is provided. The method includes: receiving, by a first radio communication node, information that is about a second configuration parameter and sent by an operation, administration and maintenance OAM device; or, determining, by a first radio communication node, a second configuration parameter according to a first coordination request message received from a base station, and sending the information about a second configuration parameter to the base station, where the second configuration parameter includes a first radio resource set used for communication between the first radio communication node and a user equipment UE, and a radio resource in the first radio resource set includes a time domain resource and/or a frequency domain resource; and, scheduling, by the first radio communication node, the radio resource in the first radio resource set to communicate with the UE, where the first radio communication node is one of transmission points that communicate with the UE, the UE communicates with the transmission point by using a radio resource in the respective radio resource sets of the transmission points, the respective radio resource sets of the transmission points do not intersect, and the respective radio resource sets of the transmission points include the first radio resource set.

According to a fourth aspect, a communication method is provided. The method includes: determining, by a base station, first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource; and sending, by the base station, configuration information of corresponding radio resource sets among the N radio resource sets to the N radio communication nodes separately, so that the N radio communication nodes schedule the radio resources in respective radio resource sets to communicate with the UE, where the UE communicates with a corresponding transmission point by using respective radio resource sets of transmission points, the respective radio resource sets of the transmission points do not intersect, the respective radio resource sets of the transmission points include the N radio resource sets, and the transmission points include the N radio communication nodes.

According to a fifth aspect, a communication method is provided. The method includes: receiving, by a first radio communication node, information that is about a fourth configuration parameter and sent by an operation, administration and maintenance OAM device; or, determining, by the first radio communication node, a fourth configuration parameter according to a second coordination request message received from the base station, and sending information about a fourth configuration parameter to the base station, where the second coordination request message carries information about a fourth configuration parameter configured by the base station for communication between the first radio communication node and the UE; where, the fourth configuration parameter includes a first radio resource set used for communication between the first radio communication node and a user equipment UE, and a radio resource in the first radio resource set includes a time domain resource and/or a frequency domain resource; and scheduling, by the first radio communication node, the radio resource in the first radio resource set to communicate with the UE, where the first radio communication node is one of transmission points that communicate with the UE; communicating, by the UE, with the transmission point by using a radio resource in the respective radio resource set of the transmission point, where the respective radio resource sets of the transmission points do not intersect, and the respective radio resource sets of the transmission points include the first radio resource set.

According to a sixth aspect, a base station is provided. The base station includes: a determining unit, configured to determine first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource; a sending unit, configured to send the first resource configuration information determined by the determining unit to the UE, so that the UE communicates with the corresponding radio communication node by using the radio resource in the N radio resource sets; where, the UE communicates with a corresponding transmission point by using respective radio resource sets of a transmission points, the respective radio resource sets of the transmission points do not intersect, the respective radio resource sets of the transmission points include the N radio resource sets, and the transmission points include the N radio communication nodes.

According to a seventh aspect, a radio communication node is provided. The radio communication node includes: a receiving unit, configured to receive information that is about a second configuration parameter and sent by a base station or an operation, administration and maintenance OAM device; a determining unit, configured to determine a second configuration parameter according to the information that is about a second configuration parameter and received by the receiving unit; where the second configuration parameter includes a first radio resource set used for communication between the first radio communication node and a user equipment UE, and a radio resource in the first radio resource set includes a time domain resource and/or a frequency domain resource; a scheduling unit, configured to schedule the radio resource in the first radio resource set determined by the determining unit to communicate with the UE; where the first radio communication node is one of transmission points that communicate with the UE, the UE communicates with the transmission point by using a radio resource in the respective radio resource set of the transmission point, the respective radio resource sets of the transmission points do not intersect, and the respective radio resource sets of the transmission points include the first radio resource set.

According to an eighth aspect, a user equipment is provided. The user equipment includes: a receiving unit, configured to receive first resource configuration information sent by a base station; and a controlling unit, configured to:
      acquire the first resource configuration information received by the receiving unit, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource; and control the receiving unit to communicate with a transmission point by using a radio resource in respective radio resource sets of transmission points, where the respective radio resource sets of the transmission points do not intersect, the respective radio resource sets of the transmission points include the N radio resource sets, and the transmission points include the N radio communication nodes.

In the foregoing solutions, a base station delivers configuration information of a radio resource set used by a radio communication node that participates in multiple points transmission to a UE, radio resource sets used by the base station and the radio communication node do not intersect or radio resource sets used by a plurality of radio communication nodes do not intersect, and a radio resource in the radio resource set is used for a radio communication node corresponding to the radio resource set to schedule the UE. In this way, a base station does not need to schedule a radio resource during communication between a UE and a radio communication node so that the UE exchanges information with the base station and the radio communication nodes on corresponding radio resources separately. Therefore, multiple points transmission can also be implemented even when a backhaul link has a large delay, thereby lowering a delay requirement on a backhaul link.

BRIEF DESCRIPTION OF THE DRAWINGS

To describe the technical solutions in the embodiments of the present disclosure more clearly, the following briefly introduces the accompanying drawings that describe the embodiments. Apparently, the accompanying drawings in the following description show merely some embodiments of the present disclosure, and a person of ordinary skill in the art may still derive other drawings from these accompanying drawings without creative efforts.

FIG. 1 is a schematic diagram of a scenario in which a network system can be implemented according to an embodiment of the present disclosure;

FIG. 2 is a flow chart of a communication method according to an embodiment of the present disclosure;

FIG. 3 is a flow chart of a communication method according to another embodiment of the present disclosure;

FIG. 4 is a flow chart of a communication method according to another embodiment of the present disclosure;

FIG. 9 is a flow chart of a communication method according to an embodiment of the present disclosure;

FIG. 10 is a flow chart of a communication method according to another embodiment of the present disclosure;

DETAILED DESCRIPTION

Figure 5:
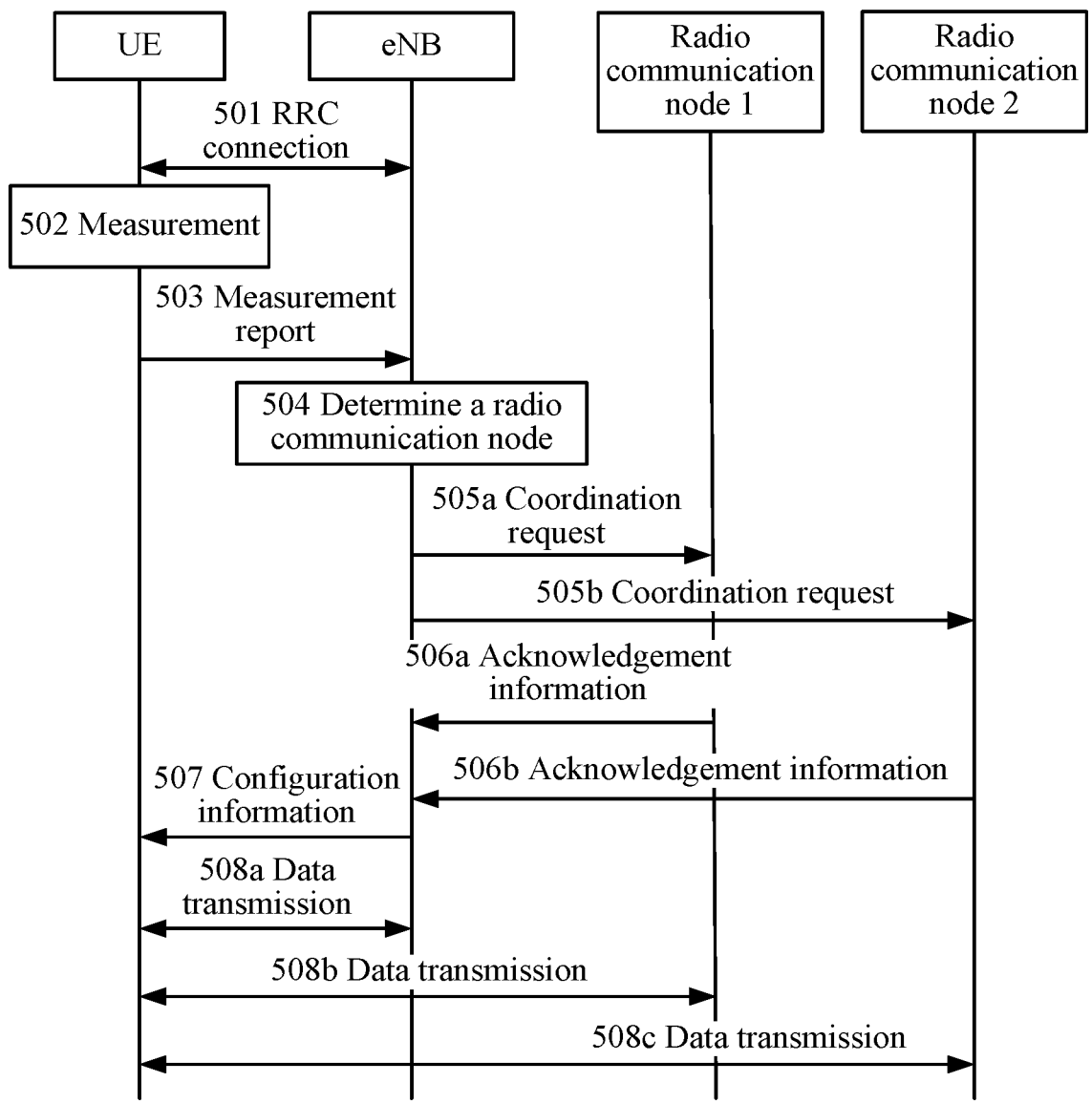
FIG. 5 is a schematic flow chart of a process of a communication method according to an embodiment of the present disclosure.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as a global system for mobile communications (GSM), a code division multiple access (CDMA) system, wideband code division multiple access (WCDMA), general packet radio service (GPRS), and long term evolution (LTE).

A user equipment (UE) may also be referred to as a mobile terminal (or mobile station), a mobile user equipment, and the like, and can communicate with one or more core networks by using a radio access network (for example, RAN, radio access network). The user equipment may be a mobile terminal, for example, a mobile phone (or referred to as a "cellular" phone) or a computer having a mobile terminal, for example, a portable, pocket-sized, handheld, computer-embedded or vehicle-mounted mobile apparatus, which exchange speech and/or data with the radio access network. In addition, a UE may have one or more MAC entities, which is not limited in the present disclosure. Preferably, a UE has a plurality of MAC entities, and each MAC entity performs scheduling during communication between a UE and one transmission point (a base station or a radio communication node).

A base station may be a base station (BTS) in GSM or CDMA, may also be a base station (e.g., NodeB) in WCDMA, and may further be an evolved NodeB (eNB or e-NodeB) in LTE, which is not limited in the present disclosure. However, for ease of description, the following embodiments are described by using an eNB as an example.

A radio communication node may be a macro base station, a small base station or a micro base station, may further be a relay station, a home base station, or a node only having a part or all of user plane processing functions, and may also be a terminal in D2D (device to device) communication, and the like.

FIG. 1 is a schematic diagram of a scenario in which a network system according to an embodiment of the present disclosure can be implemented. It should be noted that the network system in FIG. 1 is only one scenario capable of implementing the present disclosure given for clearer description of the embodiment of the present disclosure, rather than to limit the application scope of the embodiment of the present disclosure. For example, an eNB 101 and radio communication nodes 102, 103, and 104 are described in FIG. 1. However, other network systems where the embodiment of present disclosure is applicable may include more or fewer base stations or may include more or fewer radio communication nodes.

A plurality of UEs 105 and 106 may exist under coverage of a cell 100. Although only two UEs 105 and 106 are described in FIG. 1 for brevity, a network system where the embodiment of the present disclosure is applicable may include more or fewer UEs.

In the embodiment of the present disclosure, the base station and the radio communication nodes may all have the same frequency, or all have different frequencies, or a part have the same frequency and a part have different frequencies, which is not limited in the embodiment of the present disclosure. The same frequency means that center frequencies of working frequencies are the same. Different frequencies mean that center frequencies of working frequencies are different. For example, when the eNB 101 and the radio communication node 102 have the same frequency, and the center frequency is F1. The radio communication node 103 and the radio communication node 102 have different frequencies, and the center frequency of the radio communication node 103 is F2. Alternatively, the radio communication node 102 and the radio communication node 103 have the same frequency F1, the eNB 101 and the radio communication node 102 have different frequencies, and the center frequency of the eNB 101 is F2. Alternatively, the eNB 101, the radio communication node 102, and the radio communication node 103 have the same frequency F1. Alternatively, the eNB 101, the radio communication node 102, and the radio communication node 103 have different frequencies, the center frequency of the eNB 101 is F1, the center frequency of the radio communication node 102 is F2, and the center frequency of the radio communication node 103 is F3. It should be understood that the foregoing example is only exemplary, rather than to limit the embodiment of the present disclosure.

In addition, the network system in FIG. 1 may further include a small station that does not have a radio resource scheduling function to participate in multiple points transmission, for example, an RRH (remote radio head). The small station that does not have a radio resource scheduling function is connected to a base station or radio communication node that has a radio resource scheduling function and is scheduled by the base station or the radio communication node.

It should be noted that, the foregoing embodiment and the illustration thereof are also applicable to other embodiments of the present disclosure, which are no longer elaborated in the following.

FIG. 2 is a flow chart of a communication method according to an embodiment of the present disclosure. The method in FIG. 2 is executed by a base station (for example, an eNB 101 in FIG. 1).

201. The base station determines first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource.

202. Send the first resource configuration information to the UE, so that the UE communicates with the corresponding radio communication node by using the radio resource in the N radio resource sets.

The UE communicates with a corresponding transmission point by using a respective radio resource set of a transmission point, the respective radio resource sets of the transmission points do not intersect, the respective radio resource sets of the transmission points include the N radio resource sets, and the transmission points include the N radio communication nodes.

During implementation of multiple points transmission, the transmission points may include the base station, and at this time, the radio resource set used by the base station to communicate with the UE and respective radio resource sets corresponding to the N radio communication nodes do not intersect, and when N>1, the respective radio resource sets corresponding to the N radio communication nodes also do not intersect. Of course, it is also possible that the transmission points do not include the base station, and at this time, the N respective radio resource sets corresponding to N radio communication nodes for implementing multiple points transmission do not intersect. Of course, the transmission point in the embodiment of the present disclosure may further include a small station that does not have a radio resource scheduling function to participate in multiple points transmission, for example, an RRH. It should be noted that this illustration is also applicable to other embodiments.

In the foregoing solution, the base station delivers configuration information of a respective radio resource set used by a radio communication node to a radio communication node that participates in multiple points transmission to the UE. The radio resource sets used by the transmission points (including the radio communication node) that participate in multiple points transmission do not intersect, and a radio resource in the radio resource set is used for a radio communication node corresponding to the radio resource set to schedule the UE. Therefore, as a radio communication node is capable of scheduling a radio resource, that is, has a resource scheduling function, during communication between the UE and the radio communication node, the radio communication node does not need to receive, through a backhaul link, a scheduling command sent by the base station to communicate with the UE, but communicates with the UE by scheduling a radio resource, thereby lowering a delay requirement on the backhaul link. In addition, as radio resource sets used by the base station and the radio communication node do not intersect or radio resource sets used by a plurality of radio communication nodes do not intersect, interference is avoided.

Optionally, as an embodiment, the first resource configuration information may indicate N radio resource sets corresponding to N radio communication nodes in an explicit manner, that is, by using the first resource configuration information, the UE acquires directly the N radio resource sets and to which of the N radio communication nodes each radio resource set corresponds. The first resource configuration information may also indicate the N radio resource sets corresponding to the N radio communication nodes in an implicit manner. For example, by using the first resource configuration information, the UE acquires directly the N radio resource sets and that N−1 of the N radio resource sets correspond to N−1 of the N radio communication nodes, respectively. Therefore, the UE can acquire the rest one radio resource set to correspond to the rest one radio communication node. It should be understood that disclosure embodiment does not limit the manner in which the first resource configuration information indicates the N radio resource sets corresponding to the N radio communication nodes. It should be noted that this illustration is also applicable to other embodiments.

Optionally, as another embodiment, a radio resource in a radio resource set may carry at least one of the following signs: an uplink or downlink sign, to indicate a direction of using the radio resource; a sign that the radio resource is used for physical data channel transmission, and/or a sign that the radio resource is used for physical control channel transmission; a sign of an activation time of the radio resource, and the like. For example, the sign of an activation time of the radio resource may represent a time start point that a base station or a radio communication point that participates in multiple points transmission coordinates transmission, and time can be configured by referring to time of the base station.

Optionally, as another embodiment, the base station may broadcast the first resource configuration information in a form of a system broadcast message, or the base station may carry the first resource configuration information in RRC (radio resource control) signaling. The embodiment of the present disclosure does not limit a form that the base station sends the first resource configuration information. Further, the first resource configuration information may be further used to indicate information about a radio resource set used for communication between the base station and the UE.

Optionally, as another embodiment, the base station may send configuration information of a reference signal to the UE. The configuration information is configuration information of a reference signal used by the N radio communication nodes, and reference signals used by the base station and the N radio communication nodes are configured differently. Further, the base station can further send configuration of a reference signal used by the base station to the UE. For example, the configuration of the reference signal may be a PCI (physical cell identity), and a correspondence exists between the PCI and the configuration of the reference signal. The UE can learn the configuration of the reference signal according to the received PCI. Alternatively, the correspondence between the PCI and the configuration of the reference signal may be preset by the base station. It should be understood that the embodiment of the present disclosure does not limit a form that the base station sends configuration information of the reference signal to the UE.

Further, the reference signal may include at least one of the following: a CRS (common reference signal), a CSI-RS (channel state information-reference signal), a DMRS (demodulation reference signal), and an SRS (sounding reference signal). The configuration of the reference signal may be at least one of the following configuration parameters: port information of the reference signal, subframe configuration of the reference signal, a frequency of the reference signal, a period of the reference signal, and the like. For example, in FIG. 1, the period of the reference signal CSI-RS used for communication between the eNB 101 and a UE 105 is 20 ms, the period of the reference signal CSI-RS used for communication between a radio communication node 102 and the UE 105 is 30 ms, and the period of the reference signal CSI-RS used for communication between a radio communication node 103 and the UE 105 is 50 ms.

Optionally, as another embodiment, after step 201, the base station may serve as a main coordination point to coordinate a first configuration parameter of the radio communication node, so as to determine a configuration parameter used by each radio communication node. The first configuration parameter may be at least one of the following: a radio resource set corresponding to each radio communication node, configuration of a reference signal, configuration of a control channel, a correspondence between the radio resource and a radio bearer, a correspondence between the radio resource and an evolved packet switch EPS bearer, scrambling code parameter configuration, a node identifier corresponding to each radio communication node, and the like.

For example, the base station may coordinate the first configuration parameter by adopting a "command type", and separately send corresponding information about the first configuration parameter to the N radio communication nodes. That is, after determining configuration parameters used by N intra-frequency radio communication nodes that participate in multiple points transmission, the base station separately sends the configuration parameters to the N intra-frequency radio communication nodes. In addition, an identifier of the UE may be carried in information about the first configuration parameter.

In another example, the base station may coordinate the first configuration parameter by adopting a "recommendation type". The base station may separately send a corresponding first coordination request message to M1 radio communication nodes, receive information about first configuration parameters determined and sent by M2 radio communication nodes among the M1 radio communication nodes according to the first coordination request message, and determine N radio communication nodes among the M2 radio communication nodes to participate in multiple points transmission, where M1 and M2 are positive integers and M1≥M2≥N. Further, the first coordination request message may carry information about a first configuration parameter configured by the base station for the M1 radio communication nodes to separately communicate with the UE. The M1 radio communication nodes may feedback an acknowledgement message or a non-acknowledgement message (ACK/NACK). The base station may determine the N radio communication nodes among the M2 radio communication nodes that feed back acknowledgement information to participate in multiple points transmission. Specifically, the radio communication node can perform selection in the first configuration parameter that the base station recommends to use, and carry information about a selected first configuration parameter in the acknowledgement message returned to the base station. Alternatively, the radio communication node can also reject the first configuration parameter that the base station recommends to use, and carry the first configuration parameter that the radio communication node recommends to use in the acknowledgement message returned to the base station.

Optionally, as another embodiment, before step 201, the base station can receive information that is about first configuration parameters of L radio communication nodes and sent by an OAM (operation, administration and maintenance) device, and determine N radio communication nodes among the L radio communication nodes, where L is a positive integer and L≥N.

Optionally, as another embodiment, before step 201, one of the N radio communication nodes may serve as a main coordination point to coordinate first configuration parameters of other radio communication nodes. Specifically, the base station may receive information about first configuration parameters of Z1 radio communication nodes sent by one of the N radio communication nodes, and determine N radio communication nodes among the Z1 radio communication nodes to participate in multiple points transmission, where Z1 is a positive integer and Z1≥N. For a first configuration parameter coordination manner in which one of the N radio communication nodes serves as a main coordination point, reference can be made to a first configuration parameter coordination manner in which the base station serves as a main coordination point, which is no longer elaborated.

Further, the base station can send an indication message of an identifier and/or service QoS (quality of service) of the UE for multiple points transmission to a radio communication node that participates in multiple points transmission. Service QoS of the UE is used for reference in resource coordination. A QoS parameter of a service at least includes one of bit rate information, service priority information, and a service type.

The embodiment of the present disclosure coordinates a radio resource, so that radio resource sets used for communication between the radio communication node and the base station that participate in multiple points transmission and the UE do not intersect, and the base station or the radio communication node that participates in multiple points transmission schedules the UE on a corresponding radio resource, for example, sends downlink data to the UE accurately based on a scheduled moment. Therefore, interference can be effectively eliminated. Also, multiple points transmission is implemented for the UE, so that a throughput of the UE can be effectively increased.

It should be understood that the foregoing coordination manner is exemplary illustration, and the embodiment of the present disclosure does not limit the first configuration parameter coordination manner between the base station and the radio communication point. That is, the embodiment of the present disclosure is always applicable no matter how the first configuration parameter is coordinated.

Optionally, as another embodiment, before determining first resource configuration information, the base station can determine N radio communication nodes among N1 radio communication node according to a measurement report sent by the UE to participate in multiple points transmission, where N1 is a positive integer and N1≥N. The measurement report at least includes one of the following: signal strength of at least N radio communication nodes and signal quality of the at least N radio communication nodes. The base station can further determine the N radio communication nodes according to at least one of the following: a moving speed of the UE, load of the N radio communication nodes, a QoS parameter of the UE, service information of the UE, and the like. The base station can further determine N radio communication nodes according to a stored access record of the UE, where the access record includes an access frequency of the UE and/or a CSG (closed subscriber group) cell of the UE, and the like. Further, the UE can carry information of a CSG cell in an RRC approximate indication message and report the information to the base station.

For example, if signal strength and/or signal quality of a radio communication node 1 measured by the UE reaches a preset threshold, and/or load of a radio communication node 1 is lower than a preset threshold, the base station can select the radio communication node 1 as one of the N radio communication nodes that participate in multiple points transmission. In another example, if time that the UE continuously uses a service in a current service cell exceeds the preset threshold, and/or a current moving speed of the UE is lower than the preset threshold, and the like, the base station can select the current service cell as one of the N radio communication nodes that participate in multiple points transmission. In yet another example, the access record of the UE indicates that a radio communication node 2 is a cell that the UE often accesses, and/or a radio communication node 2 is a CSG cell of the UE, and the like, the base station can select the radio communication node 2 as one of the N radio communication nodes that participate in multiple points transmission. In yet another example, when a service attribute of the UE shows that the UE currently has a plurality of radio bearers to transmit, and/or the QoS parameter of the UE shows a case that the radio bearer of the UE is a Non-GBR (non guaranteed bit rate) service, the base station can decide to perform multiple points transmission for the UE and determine the N radio communication nodes that participate in multiple points transmission.

Therefore, the base station in the embodiment of the present disclosure determines a radio communication node that performs multiple points transmission for the UE and can select a more suitable radio communication point to communicate with the UE.

It should be understood that the embodiment of the present disclosure does not limit a manner in which the base station determines a radio communication node that participates in multiple points transmission. It should be further noted that the embodiment of the present disclosure does not limit a sequence of resource coordination for the N radio communication nodes that participate in multiple points transmission determined by the base station.

Optionally, as another embodiment, the base station can send to the UE at least one of the following information: first identifier information, instruction information, second identifier information, third identifier information, and information about scrambling code parameter configuration.

The first identifier information may be used for indicating a correspondence between N radio resource sets and reference signals used by N radio communication nodes. Further, the UE measures a downlink reference signal on a corresponding downlink radio resource or sends a corresponding uplink reference signal on a corresponding uplink radio resource according to the correspondence; and/or measures a channel instruction according to the reference signals, and separately sends a measurement result to the foregoing N radio communication nodes on corresponding radio resources according to the correspondence; and/or separately performs channel estimation on corresponding radio resources by using the reference signals according to the correspondence, and decodes information on corresponding radio resources according to a channel estimation result. Further, the first identifier information may further be used for identifying a correspondence between a base station and a reference signal used by the base station.

The instruction information may be used to instruct the UE to receive a corresponding control channel according to a type of the control channel of the base station or the radio communication node. For example, the UE receives a control channel by adopting an ePDCCH (evolved physical downlink control channel) or PDCCH manner according to the instruction information. Preferably, when the type of the control channel is ePDCCH, the instruction information may further include frequency domain configuration information of the ePDCCH, for example, configuration of a PRB (physical resource block). The UE can receive a control channel in an ePDCCH manner from a corresponding frequency domain position according to configuration.

The second identifier information may be used for indicating a correspondence between N radio resource sets and a transmission channel, a radio bearer or an EPS (evolved packet switch) bearer. Further, the second identifier information may be further used for indicating a correspondence between a radio resource set used by the base station and a transmission channel, a radio bearer, or an EPS bearer.

The third identifier information may be used for indicating identifiers of the base station and the N radio communication nodes. Further, the identifiers of the base station and the N radio communication nodes respectively correspond to the radio resource sets used by the base station and the N radio communication nodes in a one-to-one manner. The first identifier information may be used for indicating correspondences between the identifiers of the N radio communication nodes and reference signals used by the N radio communication nodes. The second identifier information may be used for indicating a correspondence between identifiers of the N radio communication nodes and a transmission channel, a radio bearer, or an EPS bearer.

The information about scrambling code parameter configuration may be used for instructing the UE to separately descramble a downlink reference signal or a downlink physical channel, and/or used for instructing the UE to separately scramble an uplink reference signal or an uplink physical channel. The foregoing downlink reference signal, downlink physical channel, uplink reference signal or uplink physical channel belong to the foregoing base station or the foregoing N radio communication nodes.

Specifically, the base station or the radio communication node can send a reference signal on a corresponding radio resource. The UE can measure a reference signal on a radio resource based on a configured correspondence between the reference signal and the radio resource. For example, the base station or the radio communication node can send a CSI-RS on the radio resource (for example, a specific subframe or PRB), and the UE measures the CSI-RS to obtain a CSI (channel state information) measurement result of the radio resource. Alternatively, the base station or the radio communication node can send a DMRS on the radio resource (for example, a specific subframe or PRB), and the UE measures a DMRS and uses a measurement result to decode a signal on the radio resource. Alternatively, the UE can send an SRS corresponding to the radio resource on the radio resource (for example, a specific subframe or PRB).

It should be understood that the embodiment of the present disclosure does not limit the form that the base station sends the foregoing information to the UE and the sending sequence.

Optionally, as another embodiment, before determining first resource configuration information, the base station can establish an RRC connection with the UE, and separately send a connection configuration parameter of the UE to the UE and the N radio communication nodes, where the connection configuration parameter is used for enabling the UE to separately establish a user plane connection with the N radio communication nodes, and the connection configuration parameter at least includes a physical layer configuration parameter and a MAC layer configuration parameter. Further, the connection configuration parameter may further include a configuration parameter of an RLC layer or a PDCP layer. Specifically, the base station delivers configuration of a physical layer and a MAC layer corresponding to a DRB (data radio bearer) to the UE, and the base station sends the configuration of the physical layer and the MAC layer corresponding to the DRB to the radio communication node.

In the prior art, a macro base station and a plurality of small base stations can be deployed in an integrated manner to increase a system capacity through a gain from cell splitting. Specifically, the UE is handed over every time entering a small cell under a small base station from a macro cell under a macro base station, so as to offload data to a small base station, thereby implementing data offload. When leaving a small cell under a small base station to enter a macro cell under a macro base station, the UE is handed over again, and the macro base station provides a service, thereby guaranteeing service continuity. However, a problem of increased number of handovers is caused. When more small base stations are deployed, the number of handovers grows larger, and handover performance decreases.

In the embodiment of the present disclosure, because multiple points transmission is adopted, downlink RRC signaling and/or data can be transmitted from the base station or the radio communication point to the UE, and/or the base station or the radio communication point receives uplink RRC signaling and/or data from the UE. As a preferable solution, RRC signaling or an SRB (signaling radio bearer) is sent and/or received by the base station, and specifically, the base station and the UE may directly perform transmission, or the radio communication node performs forwarding, so as to keep an RRC connection of the UE at a macro base station. When the UE traverses a coverage boundary of a radio communication node under coverage of the base station, as the RRC connection is always kept at the base station, a handover is avoided and the number of handovers is lowered.

Optionally, as another embodiment, the radio communication node can perform segmentation processing, according to segmentation information fed back to an RLC entity by a MAC entity of the radio communication node, on transmission data at the RLC entity of the radio communication node.

Optionally, as another embodiment, multiple points transmission for the UE may be performed by the base station and one or more radio communication nodes, or by a plurality of radio communication nodes while the base station does not participate in multiple points transmission. For example, the base station and the UE transmit RRC signaling and data DRB 1 on a corresponding radio resource, and a radio communication node 104 and the UE transmit data DRB 2 on a corresponding radio resource. Alternatively, the base station and the UE transmit RRC signaling on a corresponding radio resource, the radio communication node 102 and the UE transmit data DRB 1 on a corresponding radio resource, and the radio communication node 103 and the UE transmit data DRB 2 on a corresponding resource. Alternatively, the base station and the UE transmit RRC signaling and data DRB 1 on a corresponding radio resource, the radio communication node 104 and the UE transmit data RRC signaling and data DRB 2 on a corresponding radio resource. Alternatively, an RRC connection is established between the base station and the UE, the radio communication node 102 and the UE transmit RRC signaling and data DRB 1 on a corresponding radio resource, and the radio communication node 103 and the UE transmit data DRB 2 on a corresponding resource. In addition, the base station may send an RRC message to the UE directly or indirectly (for example, first sends the RRC message to the first radio communication node).

In another example, a subframe 2 and a subframe 6 on a time domain are an uplink radio resource and a downlink radio resource used for communication between the radio communication node 102 and the UE 105, respectively. The UE sends uplink signaling and/or uplink data to the radio communication node 102 on the subframe 2, whereas the UE receives, on the subframe 6, downlink signaling and/or downlink data sent by the radio communication node 102.

In yet another example, a PRB 10 and PRB 12 on a frequency domain are an uplink radio resource and a downlink radio resource used for communication between the radio communication node 103 and the UE 105, respectively. The UE sends uplink signaling and/or uplink data to the radio communication node 103 on the PRB 10, whereas the UE receives, on the PRB 12, downlink signaling and/or downlink data sent by the radio communication node 103. The signaling herein refers to RRC signaling, which is transmitted on an SRB, whereas data is transmitted on a DRB.

Therefore, the base station and/or the radio communication node and the UE transmit data on an aggregated time domain resource (for example, a time slot or subframe). Alternatively, the base station and/or the radio communication node and the UE transmit data on an aggregated frequency domain resource (for example, a PRB). Therefore, the throughput of the UE can be effectively increased.

In addition, for an inter-frequency scenario, radio resource sets of all transmission points that participate in multiple points transmission may be time domain resource sets that do not intersect. A transmission point that participates in multiple points transmission may be a base station and at least one radio communication node, and may also be a plurality of radio communication nodes. A small station that does not have a radio resource scheduling function may be also included to participate in multiple points transmission, for example, an RRH, and the small station that does not have radio resource scheduling is connected to a base station or a radio communication node that has a radio resource scheduling function and is scheduled by the base station or the radio communication node.

That a base station and one radio communication node serve as transmission points that participate in multiple points transmission is used as an example, the base station and the radio communication node have different frequencies, that is, center frequencies of working frequencies are different. The base station and the radio communication node perform coordination on the time domain, and then separately schedule the UE on a corresponding time domain resource, so that the throughput of the UE is increased. Alternatively, when a base station with large coverage transmits RRC signaling and a radio communication node in a hotspot region transmits a DRB, as the RRC signaling connection is always at the base station, the number of handovers can be lowered, and handover performance is enhanced.

It should be understood that the foregoing solutions of performing coordination on the configuration parameter and determining a participant radio communication node are also applicable to an inter-frequency scenario, which are no longer described herein.

A non-limiting example of a communication method in the embodiment of the present disclosure is further described in further detail in the following in combination with specific embodiments.

FIG. 3 is a flow chart of a communication method according to another embodiment of the present disclosure. The method in FIG. 3 is executed by a radio communication node (for example, a radio communication node 102 or a radio communication node 103 or a radio communication node 104 in FIG. 1) and corresponds to a method in FIG. 2, and therefore repeated description for the embodiment in FIG. 2 is properly omitted.

301. A first radio communication node receives information that is about a second configuration parameter and sent by an operations, administration and maintenance OAM device; or a first radio communication node determines a second configuration parameter according to a first coordination request message received from a base station, and send information about the second configuration parameter to the base station, where the first coordination request message carries information about the second configuration parameter configured by the base station for communication between the first radio communication node and a UE.

The second configuration parameter includes a first radio resource set used for communication between the first radio communication node and a user equipment UE, and a radio resource in the first radio resource set includes a time domain resource and/or a frequency domain resource.

302. The first radio communication node schedules the radio resource in the first radio resource set to communicate with the UE.

The first radio communication node is one of transmission points that communicate with the UE, the UE communicates with the transmission point by using a radio resource in the respective radio resource set of the transmission point, the respective radio resource sets of the transmission points do not intersect, and the respective radio resource sets of the transmission points include the first radio resource set.

The embodiment of the present disclosure coordinates a radio resource, so that radio resource sets used by the base station and the radio communication node do not intersect or radio resource sets used by a plurality of radio communication nodes do not intersect. A base station or a radio communication node that participates in multiple points transmission schedules the UE on a corresponding radio resource. Therefore, as a radio communication node is capable of scheduling a radio resource, that is, has a resource scheduling function, during communication between the UE and the radio communication node, the radio communication node does not need to receive, through a backhaul link, a scheduling command sent by the base station to communicate with the UE, but communicates with the UE by scheduling a radio resource, thereby lowering a delay requirement on the backhaul link. Also, as radio resource sets used by the base station and the radio communication node do not intersect or radio resource sets used by a plurality of radio communication nodes do not intersect, interference is avoided.

An embodiment in which a radio resource may carry a sign is as discussed above, which is no longer described herein.

Optionally, as another embodiment, the second configuration parameter further includes at least one of the following: configuration of a reference signal, configuration of a control channel, a correspondence between a radio resource and a radio bearer, a correspondence between a radio resource and an EPS bearer, scrambling code parameter configuration, and node identifiers of N radio communication nodes. Further, the reference signal can include at least one of the following: a CRS, a CSI-RS, a DMRS, an SRS, and the like.

Optionally, as another embodiment, the first coordination request message may carry information about a second configuration parameter configured by the base station for communication between the first radio communication node and the UE.

For example, the first radio communication node can use a second configuration parameter carried in a first coordination request message sent by the base station as a second configuration parameter of the first radio communication node, and returns acknowledgement information to the base station. Alternatively, the first radio communication node can perform selection in the second configuration parameter carried in the first coordination request message, use a selected second configuration parameter as the second configuration parameter of the first radio communication node, and carry information about the selected second configuration parameter in the acknowledgement information returned to the base station. Alternatively, the first radio communication node can further reject the second configuration parameter that the base station recommends to use, and carry the second configuration parameter that the radio communication node recommends to use in the acknowledgement message returned to the base station. The first coordination request message may further carry an indication message of an identifier and service QoS of the UE. Service QoS of the UE is used for reference during resource coordination. A QoS parameter of a service at least includes one of bit rate information, service priority information, and a service type.

Optionally, as another embodiment, when another radio communication node (a second radio communication node) that participates in multiple points transmission serves as a main coordination point to coordinate a resource, the first radio communication node can determine the second configuration parameter according to a coordination request message sent by the second radio communication node. Further, the coordination request message carries information about a second configuration parameter configured for communication between the first radio communication node and the UE. Alternatively, the coordination request message may further carry the indication message of the identifier and/or service QoS of the UE. The service QoS of the UE is used for reference during resource coordination. The QoS parameter of the service at least includes one of bit rate information, service priority information, and the service type.

Optionally, as another embodiment, the first radio communication node may serve as a main coordination point to determine information about the second configuration parameter. For a second configuration parameter coordination manner in which the first radio communication node serves as the main coordination point, reference can be made to the foregoing second configuration parameter coordination manner in which the base station serves as the main coordination point, which is no longer described herein.

It should be understood that the foregoing example is only exemplary, and the embodiment of the present disclosure does not limit the second configuration parameter coordination manner.

Optionally, as another embodiment, the first radio communication node can send to the UE at least one of the following information: first identifier information, instruction information, second identifier information, third identifier information, and information about scrambling code parameter configuration.

An effect of the foregoing information is as discussed above, which is no longer described herein. It should be understood that the embodiment of the present disclosure does not limit a form and sequence that the base station sends the foregoing information to the UE.

Optionally, as another embodiment, the first radio communication node can perform segmentation processing, according to segmentation information fed back to an RLC entity by a MAC entity of the first radio communication node, on transmission data at the RLC entity of the first radio communication node.

An embodiment in which the base station or the radio communication node and the UE transmit data and/or signaling is as discussed above, which is no longer described herein.

Therefore, the base station and/or the radio communication node and the UE transmit data on an aggregated time domain resource (for example, a time slot or subframe). Alternatively, the base station and/or the radio communication node and the UE transmit data on an aggregated frequency domain resource (for example, a PRB). Therefore, a throughput of the UE can be effectively increased.

In addition, for an inter-frequency scenario, radio resource sets of all transmission points that participate in multiple points transmission may be time domain resource sets that do not intersect. A transmission point that participates in multiple points transmission may be a base station and at least one radio communication node, and may also be a plurality of radio communication nodes. For example, the base station and the first radio communication node perform coordination on the time domain, and then schedule the UE on corresponding time domain resources, respectively, so that the throughput of the UE is increased. Alternatively, when a base station with large coverage transmits RRC signaling and a first radio communication node in a hotspot region transmits a DRB, as RRC signaling connection is always at the base station, the number of handovers can be lowered, and handover performance is enhanced.

It should be understood that the foregoing solutions of performing coordination on the configuration parameter and determining a participant radio communication node are also applicable to an inter-frequency scenario, which are no longer described herein.

A non-limiting example of a communication method in the embodiment of the present disclosure is further described in further detail in the following in combination with specific embodiments.

FIG. 4 is a flow chart of a communication method according to another embodiment of the present disclosure. The method in FIG. 4 is executed by a UE (for example, a UE 104 or UE 105 in FIG. 1) and corresponds to a method in FIG. 1 or FIG. 2. Therefore, repeated description for the embodiment in FIG. 1 or FIG. 2 is properly omitted. The UE can have one or more MAC entities, which is not limited in the embodiment of the present disclosure. Optionally, the UE has a plurality of MAC entities, and each MAC entity performs scheduling during communication between the UE and one transmission point.

401. The UE receives first resource configuration information sent by a base station, where the first resource configuration information is used for indicating N radio resource sets that are used when N radio communication nodes separately perform communication with a user equipment UE, N is a positive integer, a radio resource in each radio resource set among the N radio resource sets is used for a radio communication node corresponding to each radio resource set to schedule the UE, and the radio resource includes a time domain resource and/or a frequency domain resource.

402. The UE communicates with a corresponding transmission point by using a radio resource in a respective radio resource set of the transmission point, where the respective radio resource sets of the transmission points do not intersect, the respective radio resource sets of the transmission points include the N radio resource sets, and the transmission points include the N radio communication nodes.

Optionally, the transmission points further include the base station, and a radio resource set used by the UE further includes a radio resource set used for communication between the UE and the base station.

In the embodiment of the present disclosure, the UE receives configuration information of radio resource sets used by radio communication nodes that participate in multiple points transmission, which is delivered by the base station. The radio resource sets used by the base station and the radio communication node do not intersect or radio resource sets used by a plurality of radio communication nodes do not intersect, and a radio resource in the radio resource set is used for a radio communication node corresponding to the radio resource set to schedule the UE. Therefore, as a radio communication node is capable of scheduling a radio resource, that is, has a resource scheduling function, during communication between the UE and a radio communication node, a radio communication node does not need to receive, through a backhaul link, a scheduling command sent by the base station to communicate with the UE, but the radio communication node schedules a radio resource to communicate with the UE, thereby lowering a delay requirement on the backhaul link. Also, as radio resource sets used when the UE communicates with the base station and the radio communication node do not intersect or radio resource sets used when the UE communicates with a plurality of radio communication nodes do not intersect, interference is avoided.

In addition, data sent by the UE to the base station or the radio communication node may be not modulated and encoded, and therefore, a size of a data packet is not increased. In this way, a bandwidth requirement on a backhaul link is also lowered.

In the prior art, a macro base station and a plurality of small base stations can be deployed in an integrated manner to increase a system capacity through a gain from cell splitting. Specifically, the UE is handed over every time entering a small cell under a small base station from a macro cell under a macro base station, so as to offload data to a small base station, thereby implementing data offload. When leaving a small cell under a small base station to enter a macro cell under a macro base station, the UE is handed over again, and the macro base station provides a service, thereby guaranteeing service continuity. However, a problem of increased number of handovers is caused. When more small base stations are deployed, the number of handovers grows larger, and handover performance decreases.

In the embodiment of the present disclosure, because multiple points transmission is adopted, downlink RRC signaling and/or data can be transmitted from a plurality of transmission points to the UE, and/or a plurality of transmission points can receive uplink RRC signaling and/or data from a UE. As a preferable solution, the base station sends and/or receives RRC signaling or an SRB, and specifically, the base station and the UE may directly perform transmission, or the radio communication node performs forwarding, so as to keep an RRC connection of the UE at a macro base station. When the UE traverses a coverage boundary of a radio communication node under coverage of the base station, as the RRC connection is always kept at the base station, a handover is avoided and the number of handovers is lowered.

Optionally, as another embodiment, the UE can keep uplink or downlink synchronization with each transmission point that participates in multiple points transmission. In addition, for a UE having a single radio frequency capability, the UE can correspondingly switch a receiver or a transmitter among a plurality of transmission points according to time domain resources used by the plurality of transmission points.

In addition, for an inter-frequency scenario, radio resource sets of all transmission points that participate in multiple points transmission may be time domain resource sets that do not intersect. A transmission point that participates in multiple points transmission may be a base station and at least one radio communication node, and may also be a plurality of radio communication nodes. That a base station and one radio communication node serve as transmission points that participate in multiple points transmission is used as an example, the base station and the radio communication node have different frequencies, that is, center frequencies of working frequencies are different. The base station and the radio communication node perform coordination on a time domain, and then schedule the UE on a corresponding time domain resource, respectively, so that a throughput of the UE is increased. Alternatively, when a base station with large coverage transmits RRC signaling and a radio communication node in a hotspot region transmits a DRB, as the RRC signaling connection is always at the base station, the number of handovers can be lowered, and handover performance is enhanced.

It should be understood that the foregoing solutions of performing coordination on the configuration parameter and determining a participant radio communication node are also applicable to an inter-frequency scenario, which are no longer described herein.

The embodiments of the present disclosure are described in detail in the following in combination with specific examples. In FIG. 5 to FIG. 8 in the following, an example of a base station is an eNB, and it should be noted that the embodiment of the present disclosure is not limited thereto. It should be further understood that the embodiment of the present disclosure does not limit the number of the UEs and radio communication nodes, which may be one or more. It should be further noted that that the radio communication node may be a macro base station, a small base station, or a micro base station, and may further be a relay station, a home base station, or a node only having a user plane processing function, which is not limited in the embodiment of the present disclosure.

In addition, besides the foregoing eNB and radio communication nodes, the system in the embodiment of the present disclosure may further include a small station that does not have a radio resource scheduling function to participate in multiple points transmission, for example, an RRH. The small station that does not have radio resource scheduling is connected to a base station or a radio communication node that has a radio resource scheduling function, and is scheduled by the base station or the radio communication node. The embodiment of the present disclosure does not limit whether the transmission points have a same frequency or have different frequencies.

FIG. 5 to FIG. 8 are schematic flow charts of a process of a communication method for the gateway system in FIG. 1 according to embodiments of the present disclosure.

FIG. 5 is a schematic flow chart of a process of a communication method according to an embodiment of the present disclosure.

501. A UE establishes an RRC connection with an eNB.

502. The UE performs a measurement.

For example, the UE can measure signal strength and/or signal quality of a plurality of radio communication nodes, where the plurality of radio communication nodes at least include a radio communication node 1 and a radio communication node 2.

503. The UE sends a measurement report to the eNB.

For example, a measurement report can include at least one of the following: signal strength of a radio communication node, signal quality of a radio communication node, and the like.

504. The eNB determines a radio communication node that participates in multiple points transmission.

For example, in a case in which a service attribute of the UE shows that the UE currently has a plurality of radio bearers to transmit, and/or a QoS parameter of the UE shows that a radio bearer of the UE is a non-guaranteed Non-GBR service or other cases, the eNB can decide that the UE performs multiple points transmission.

Further, the eNB can determine a radio communication node that participates in multiple points transmission according to the measurement report sent by the UE. For example, if the signal strength and/or signal quality of the radio communication nodes, namely, the radio communication node 1 and the radio communication node 2 measured by the UE reaches a preset threshold, and/or load of the radio communication node 1 and the radio communication node 2 is lower than a preset threshold, or in other cases, the eNB can select the radio communication node 1 and the radio communication node 2 as radio communication nodes that participate in multiple points transmission. In another example, if the time that a UE continuously uses a service in a radio communication node 1 of a current service cell exceeds a preset threshold, and/or a current moving speed of the UE is lower than a set threshold, and the like, the eNB can select the radio communication node 1 as one of the plurality of radio communication nodes that participate in multiple points transmission. Optionally, the eNB can further determine N radio communication nodes according to a stored access record of the UE, where the access record includes an access frequency of the UE and/or a CSG cell of the UE, and the like. For example, the access record of the UE indicates that the radio communication node, namely, the radio communication node 2 as the cell that the UE often accesses, and/or that the radio communication node 2 is a CSG cell of the UE, the eNB can select the radio communication node 2 as one of a plurality of radio communication nodes that participate in multiple points transmission. In this way, a more suitable transmission point can be selected to transmit data for the UE.

It should be understood that the embodiment of the present disclosure does not limit the manner in which the eNB determines a radio communication node that participates in multiple points transmission.

505*a*. The eNB sends a coordination request message to a radio communication node 1.

505*b*. The eNB sends a coordination request message to a radio communication node 2.

506*a*. The radio communication node 1 returns acknowledgement information to the eNB.

506*b*. The radio communication node 2 returns acknowledgement information to the eNB.

For example, the eNB may serve as a main coordination point to coordinate configuration parameters for the radio communication node 1 and the radio communication node 2. The configuration parameter may be a radio resource set, configuration of a reference signal, configuration of a control channel, a correspondence between a radio resource and a radio bearer, a correspondence between a radio resource and an EPS bearer, scrambling code parameter configuration, a node identifier of a radio communication node, and the like. Specifically, a coordination request message can be separately sent to the radio communication node 1 and the radio communication node 2. The radio communication node 1 and the radio communication node 2 determine and carry in the acknowledgement information returned to the eNB information about the configuration parameter according to the received coordination request messages. By taking the coordination of a radio resource set and configuration of a reference signal as an example, an uplink radio resource and a downlink radio resource used for communication between the radio communication node 1 and the UE are respectively a PRB 10 and a PRB 12 on the frequency domain, and a CSI-RS with a period of 30 ms is adopted. An uplink radio resource and a downlink radio resource used for communication between the radio communication node 2 and the UE are respectively a PRB 19 and a PRB 20 on the frequency domain, and a CSI-RS with a period of 50 ms is adopted. Optionally, the eNB can carry in the coordination request message the information about the configuration parameter configured by the eNB for the radio communication node 1 and the radio communication node 2. The radio communication node 1 and the radio communication node 2 can return acknowledgement information, or carry in the acknowledgement information the configuration parameter recommended to use. Further, the eNB can send an indication message of an identifier and/or service QoS of a UE to the radio communication node 1 and the radio communication node 2. The service QoS of the UE is used for reference during resource coordination. The QoS parameter of the service at least includes one of bit rate information, service priority information, and a service type.

Optionally, the eNB can coordinate configuration parameters by adopting a "command type", and separately send to the radio communication node 1 and the radio communication node 2 corresponding information about a first configuration parameter. The radio communication node 1 and the radio communication node 2 do not need to return acknowledgement information to the eNB. It should be understood that the embodiment of the present disclosure does not limit the configuration parameter coordination manner.

Further, a radio resource set used by the eNB and radio resource sets used by the radio communication node 1 and the radio communication node 2 do not intersect, and configuration parameters of adopted reference signals are different from each other. For example, the radio resources used by the eNB are PRB 13 to PRB 16 on the frequency domain, and a CSI-RS with a period of 60 ms is adopted.

It should be understood that the selection of a time domain resource or a frequency domain resource in the foregoing example is only exemplary, rather than to limit the embodiment of the present disclosure. It should be further noted that a combination of a time domain resource and a frequency domain resource can be adopted for one same transmission point.

In the embodiment of the present disclosure, radio resources are coordinated, so that radio resource sets used for communication between a transmission point that participates in multiple points transmission and a UE do not intersect, and a base station or a radio communication node that participates in multiple points transmission schedules the UE on a corresponding radio resource, for example, sends downlink data to the UE accurately based on a scheduled moment. In this way, interference can be effectively eliminated. In addition, multiple points transmission is performed for a UE; therefore, a throughput of the UE can be effectively increased.

507. The eNB configures information for the UE.

For example, the eNB sends to the UE information about radio resource sets used by the radio communication node 1 and the radio communication node 2. Further, a radio resource in a radio resource set may carry an uplink or downlink sign to indicate a direction of using the radio resource; and/or may carry a sign of that the radio resource is used for physical data channel transmission and/or used for physical control channel transmission; and/or may carry a sign of an activation time of a radio resource. Optionally, the foregoing reference signal can include at least one of a CRS, a CSI-RS, an SRS, and a DMRS. It should be understood that the embodiment of the present disclosure does not limit the form of adopting a reference signal.

Optionally, as an embodiment, the eNB can send first identifier information to the UE. The UE identifies correspondences between radio resource sets used by the radio communication node 1 and the radio communication node 2 and a reference signal according to the first identifier information. Further, the UE can measure a corresponding downlink reference signal on a corresponding downlink radio resource or send a corresponding uplink reference signal on a corresponding uplink radio resource according to the correspondence. The UE can measure a channel instruction according to the reference signals, and separately send a measurement result to the radio communication node 1 and the radio communication node 2 on corresponding radio resources according to the correspondences. The UE can further perform channel estimation on corresponding radio resources by using the reference signals according to the correspondences, respectively, and perform decoding on corresponding radio resources according to a channel estimation result. Further, the UE can identify a correspondence between an eNB and a reference signal used by the eNB according to the first identifier information.

Optionally, as another embodiment, the eNB can send instruction information to the UE. The UE receive a corresponding control channel by using the instruction information according to the type of a control channel of the eNB, the radio communication node 1 or the radio communication node 2. For example, the UE receives a control channel in an ePDCCH or PDCCH manner according to the instruction information. Preferably, when the type of the control channel is an ePDCCH, the frequency domain configuration information of the ePDCCH may be further included, for example, configuration of the PRB, and the UE can receive the control channel for the type of ePDCCH at a corresponding frequency domain position according to the configuration.

Optionally, as another embodiment, the eNB can send second identifier information to the UE. The UE maps data of a transmission channel, a radio bearer or an EPS bearer to a corresponding radio resource according to the second identifier information, or can map data acquired from a radio resource to a corresponding transmission channel, radio bearer or EPS bearer according to the second identifier information.

Optionally, as another embodiment, the eNB can send third identifier information to the UE, and identify the eNB, the radio communication node 1, and the radio communication node 2 according to the third identifier information.

Optionally, as another embodiment, the eNB can send information about scrambling code parameter configuration to the UE. The UE separately descrambles a downlink reference signal or a downlink physical channel of the eNB, the radio communication node 1 or the radio communication node 2 according to the information about scrambling code parameter configuration, and/or separately scrambles an uplink reference signal or an uplink physical channel of the eNB, the radio communication node 1 or the radio communication node 2 according to the information about scrambling code parameter configuration. For example, the uplink reference signal may be an SRS, and the downlink reference signal may be a DMRS, a CRS or a CSI-RS.

Specifically, the eNB, the radio communication node 1 or the radio communication node 2 can send a reference signal on a corresponding radio resource. The UE can measure a reference signal on a radio resource based on a configured correspondence between a reference signal and a radio resource. For example, the eNB, the radio communication node 1 or the radio communication node 2 can send a corresponding CSI-RS on a corresponding radio resource (for example, for the radio communication node 1, on a PRB 12, and for the radio communication node 2, on a PRB 20), and the UE measures the CSI-RS to obtain a CSI channel state measurement result of the radio resource. Alternatively, the eNB, the radio communication node 1 or the radio communication node 2 can send a corresponding DMRS on a corresponding radio resource, and the UE measures a DMRS and uses the measurement result to decode a signal on the radio resource. Alternatively, the UE can send a corresponding SRS corresponding to the radio resource on a corresponding radio resource.

The UE performs CQI measurement based on a CSI-RS with a period of 30 ms, and sends a measurement report to the radio communication node 1 on the PRB 10. The UE performs CQI measurement based on a CSI-RS with a period of 50 ms, and sends a measurement report to the radio communication node 2 on the PRB 19. In this way, measurement accuracy can be effectively enhanced.

It should be understood that the embodiment of the present disclosure does not limit the form in which the base station sends the foregoing information to the UE and the sending sequence.

508*a*. The UE transmits data with the eNB.

508*b*. The UE transmits data with the radio communication node 1.

508*c*. The UE transmits data with the radio communication node 2.

Optionally, as an implementation manner, RRC signaling and/or data can be transmitted from a plurality of transmission points to a UE. Preferably, a base station sends and receives RRC signaling or an SRB (specifically, an eNB and a UE can perform transmission directly or by means of the radio communication node 1 or the radio communication node 2 transmission), so as to keep an RRC connection of the UE at the eNB. When a UE crosses a coverage boundary of radio communication nodes under the coverage of the base station, the RRC connection is always kept at the eNB, thereby avoiding a handover and reducing the number of handovers.

Optionally, the radio communication node 1 or the radio communication node 2 transmission can perform segmentation processing, according to segmentation information fed back to an RLC entity by a MAC entity, on transmission data at the RLC entity of the radio communication node.

For example, the UE can receive downlink signaling and/or downlink data sent by an eNB, a radio communication node or a radio communication node 2 on a corresponding radio resource, and/or can send uplink signaling and/or uplink data to the eNB, the radio communication node 1 or the radio communication node 2 on a corresponding radio resource. For example, the UE sends uplink signaling and/or uplink data to the radio communication node 1 on the PRB 10, and the UE receives downlink signaling and/or downlink data sent by the radio communication node 1 on the PRB 12. In another example, the UE sends uplink signaling and/or uplink data to the radio communication node 2 on the PRB 19, and the UE receives downlink signaling and/or downlink data sent by the radio communication node 2 on the PRB 20. The foregoing signaling refers to RRC signaling and is transmitted on the SRB, and data is transmitted on the DRB.

It should be understood that the selection of a time domain resource or a frequency domain resource in the foregoing example is only exemplary, rather than to limit the embodiment of the present disclosure. It should be further noted that a combination of a time domain resource and a frequency domain resource can be adopted for one same transmission point.

Therefore, the eNB, the radio communication node 1 or the radio communication node 2 and the UE transmit data on an aggregated frequency domain resource (for example, a PRB). Specifically, for a downlink, the eNB, the radio communication node 1 or the radio communication node 2 send data the UE on corresponding radio resources, and the UE receives data on corresponding radio resources. For an uplink, the UE sends data to the eNB, the radio communication node 1 or the radio communication node 2 on a corresponding radio resource, respectively, and the eNB, the radio communication node 1 or the radio communication node 2 receives data on corresponding radio resources. In this way, a throughput of the UE can be effectively increased.

Therefore, radio resource sets used by the base station and the radio communication node do not intersect or radio resource sets used by a plurality of radio communication nodes do not intersect, and a radio resource in the radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore a delay requirement on a backhaul link is lowered. In addition, radio resource sets used by the base station and the radio communication node do not intersect or radio resource sets used by a plurality of radio communication nodes do not intersect; therefore, interference is avoided. In addition, data sent by a UE to a base station or a radio communication node may be not modulated and encoded, and therefore, the size of a data packet is not increased. In this way, a bandwidth requirement on a backhaul link is also lowered.

Figure 6:
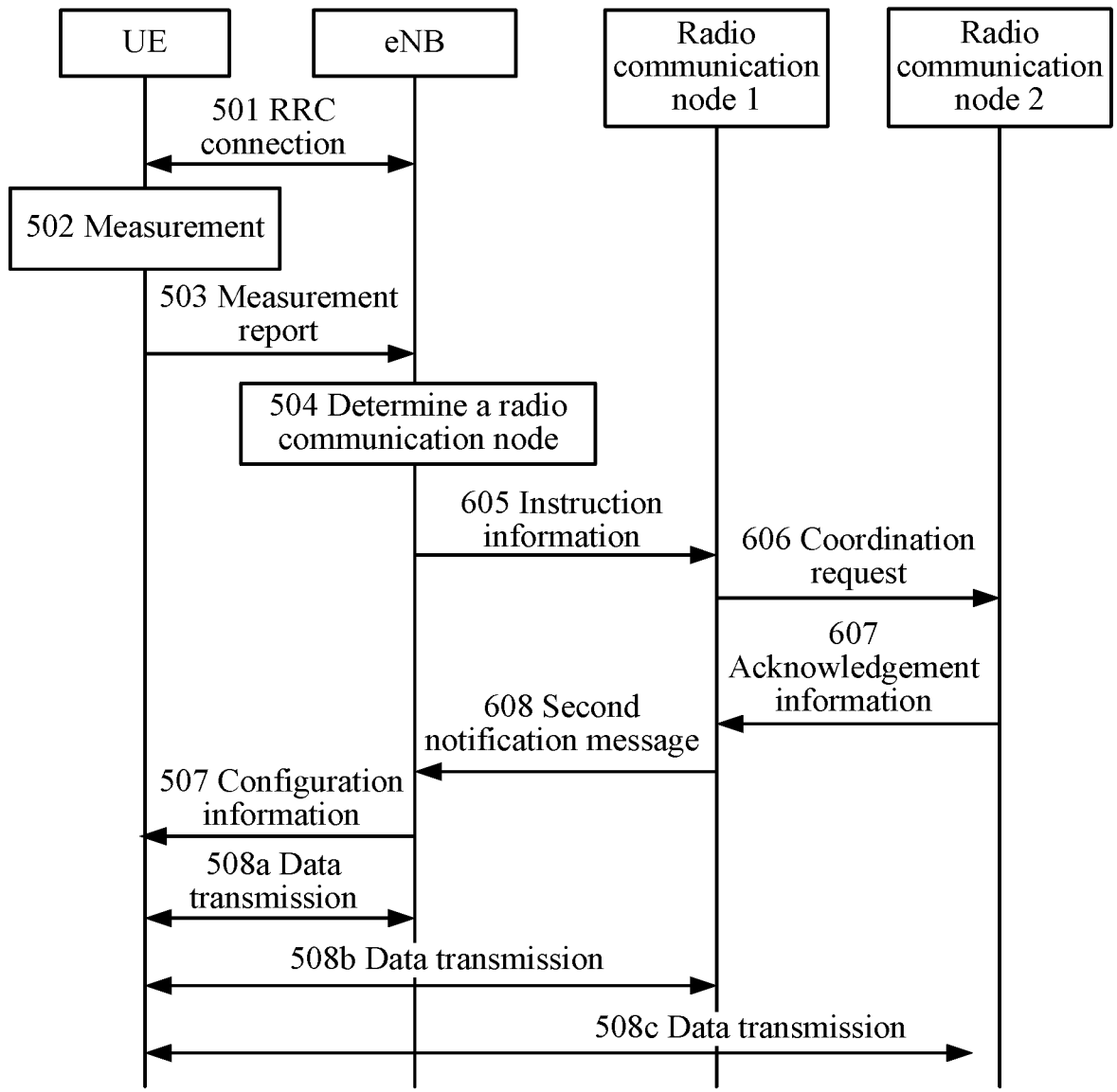
FIG. 6 is a schematic flow chart of a process of a communication method according to another embodiment of the present disclosure.

FIG. 6 is a schematic flow chart of a process of a communication method according to another embodiment of the present disclosure.

In the schematic flow chart shown in FIG. 6, same reference signs are used for steps that are the same as or similar to those in FIG. 5, which are no longer described herein to avoid repetition.

605. An eNB sends instruction information to a radio communication node 1.

606. The radio communication node 1 sends a coordination request to a radio communication node 2.

607. The radio communication node 2 returns acknowledgement information to the radio communication node 1.

608. The radio communication node 1 sends a second notification message to the eNB.

The radio communication node 1 serves as a main coordination point according to instruction information received in step 605 to perform coordination of a configuration parameter with the radio communication node 2. For example, the radio communication node 1 separately sends a coordination request message to the radio communication node 2, and the radio communication node 2 can determine, according to the received coordination request message, information about a configuration parameter and carry the information in acknowledgement information returned to the eNB. The configuration parameter takes a radio resource and a reference signal as examples, and the radio communication node 1 can carry in the coordination request message a radio resource configured by the radio communication node 1 for the radio communication node 2 and configuration of a reference signal. The radio communication node 2 can return acknowledgement information, or carry in the acknowledgement information a radio resource and a reference signal the radio communication node 1 recommends to use. For example, an uplink radio resource and a downlink radio resource used for communication between the radio communication node 2 and the UE are a PRB 19 and a PRB 20 on the frequency domain, respectively, and a CSI-RS with a period of 50 ms is adopted. Optionally, the coordination request message may further carry an indication message of an identifier and/or service QoS of a UE. The service QoS of the UE is used for reference during resource coordination. The QoS parameter of the service at least includes one of bit rate information, service priority information, and a service type. The radio communication node 1 determines that an uplink radio resource and a downlink radio resource used for communication with the UE are a PRB 10 and a PRB 12 on the frequency domain, respectively, and adopts a CSI-RS with a period of 30 ms. The radio communication node 1 sends a second notification message to the eNB, and the second notification message is used for indicating information about the configuration parameters of the radio communication node 1 and the radio communication node 2.

In the embodiment of the present disclosure, radio resources are coordinated, so that radio resource sets used for communication between a transmission point that participates in multiple points transmission and a UE do not intersect, and a base station or a radio communication node that participates in multiple points transmission schedules the UE on a corresponding radio resource, for example, sends downlink data to the UE accurately based on the scheduled moment. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

Figure 7:
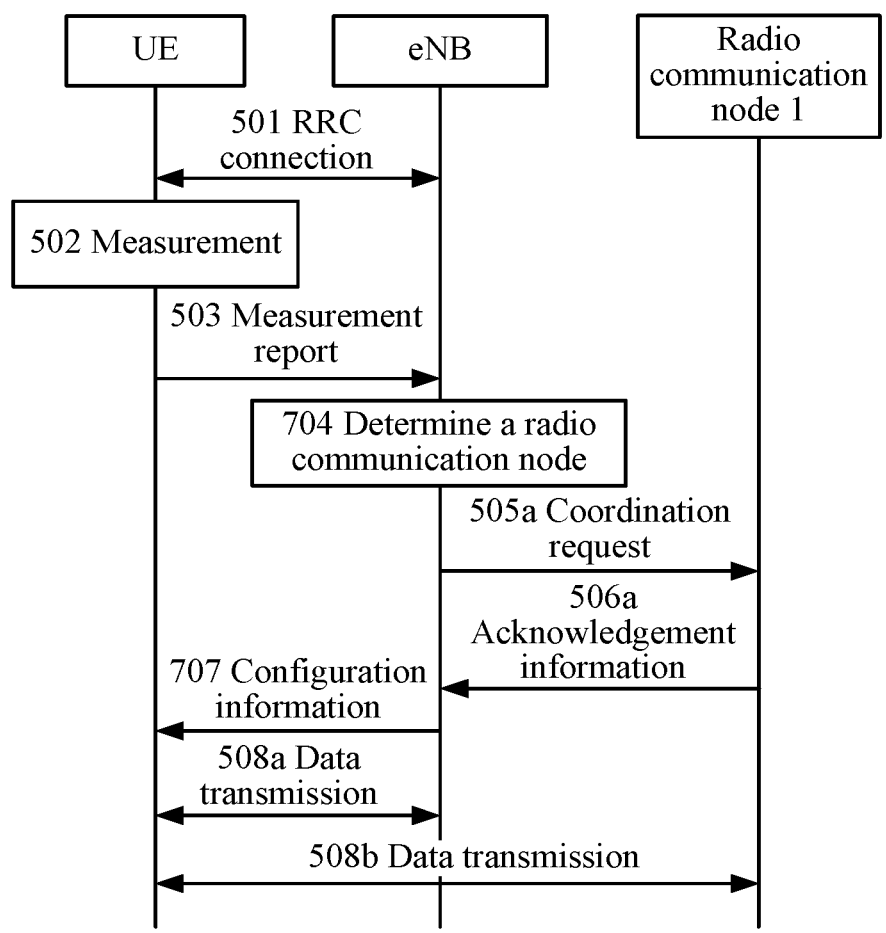
FIG. 7 is a schematic flow chart of a process of a communication method according to another embodiment of the present disclosure.

FIG. 7 is a schematic flow chart of a process of a communication method according to another embodiment of the present disclosure.

In the schematic flow chart shown in FIG. 7, same reference signs are used for steps that are the same as or similar to those in FIG. 5, which are no longer described here to avoid repetition.

704. An eNB determines a radio communication node that participates in multiple points transmission.

For example, in a case in which a service attribute of a UE shows that the UE currently has a plurality of radio bearers to transmit and/or a QoS parameter of the UE shows that a radio bearer of the UE is a non-guaranteed Non-GBR service, or other cases, the eNB can decide that the UE performs multiple points transmission.

707. The eNB configures information for the UE.

, radio resources are coordinated, so that radio resource sets used when a transmission point that participates in multiple points transmission communicates with a UE do not intersect, and a base station or radio communication node that participates in multiple points transmission schedules the UE on a corresponding radio resource, for example, sends downlink data to the UE accurately based on a scheduled moment. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

Figure 8:
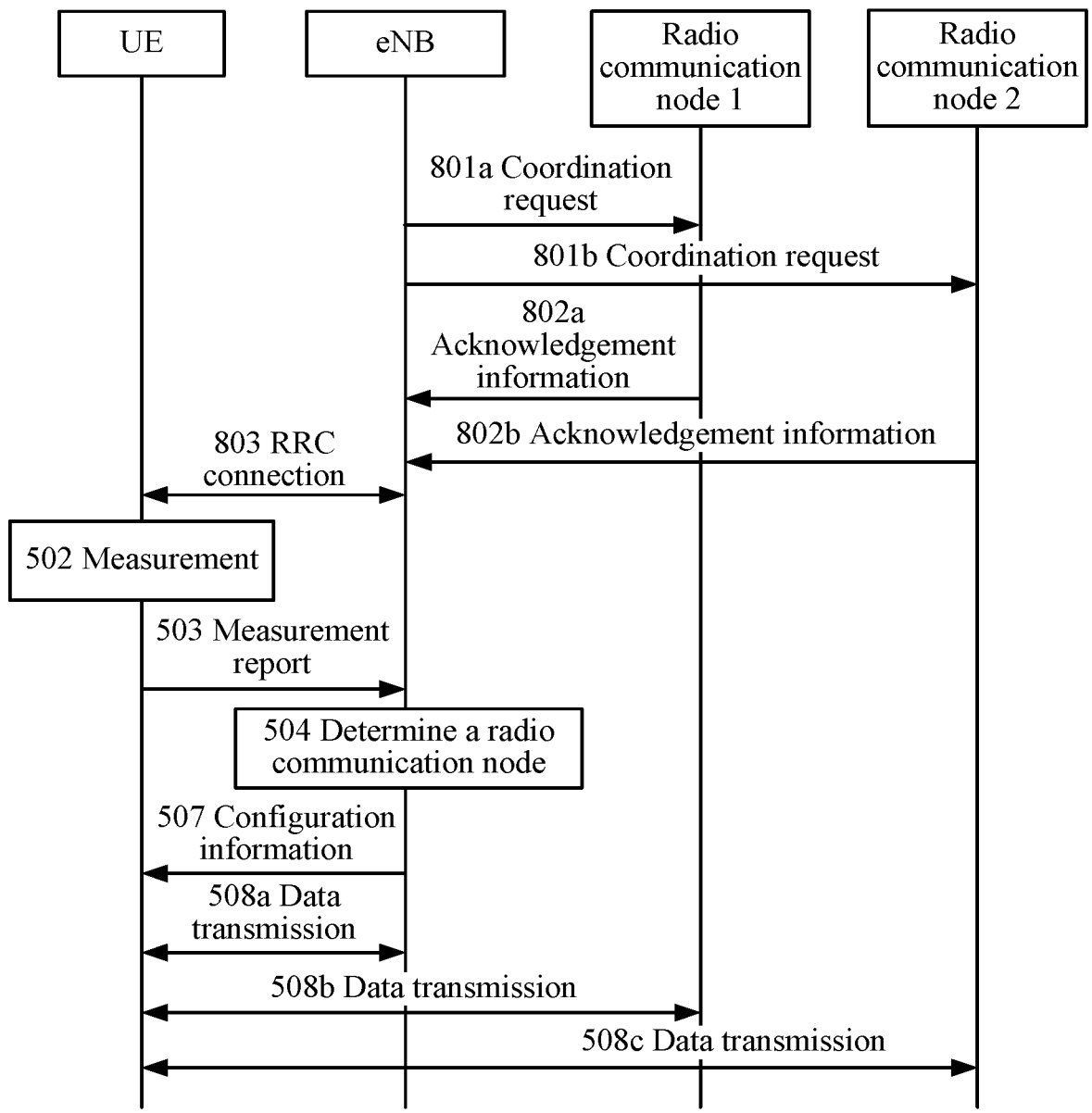
FIG. 8 is a schematic flow chart of a process of a communication method according to another embodiment of the present disclosure.

FIG. 8 is a schematic flow chart of a process of a communication method according to another embodiment of the present disclosure.

In the schematic flow chart shown in FIG. 8, same reference signs are used for steps that are the same as or similar to those in FIG. 5, which are no longer described here to avoid repetition.

801a. An eNB sends a coordination request to a radio communication node 1.

801b. The eNB sends a coordination request to a radio communication node 2.

802a. The radio communication node 1 returns acknowledgement information to the eNB.

802b. The radio communication node 2 returns acknowledgement information to the eNB.

803. A UE establishes an RRC connection with the eNB.

It should be further understood that the embodiment of the present disclosure does not limit the sequence of coordinating configuration parameters and determining a transmission point that participates in multiple points transmission.

In the foregoing solution, radio resources are coordinated, so that radio resource sets used for communication between a transmission point and a UE that participate in multiple points transmission do not intersect, and a base station or radio communication node that participates in multiple points transmission schedules the UE on a corresponding radio resource, for example, sends downlink data to the UE accurately based on a scheduled moment. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided. In addition, multiple points transmission is performed for the UE; therefore, a throughput of the UE can be effectively increased.

FIG. 9 is a flow chart of a communication method according to an embodiment of the present disclosure. A base station (for example, the eNB 101 in FIG. 1) executes the method in FIG. 9. The communication method of the present disclosure is applied to a scenario where multiple points transmission is transparent to a UE.

901. A base station determines first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource.

902. The base station sends configuration information of corresponding radio resource sets among the N radio resource sets separately to the N radio communication nodes, so that the N radio communication nodes communicate with the UE by scheduling the radio resources in respective radio resource sets.

The UE communicates with a corresponding transmission point by using a respective radio resource set of the transmission point, respective radio resource sets of the transmission points do not intersect, the respective radio resource sets of the transmission points include the N radio resource sets, and the transmission points include the N radio communication nodes.

Optionally, the transmission points may further include the base station, and the respective radio resource sets of the transmission points further include a radio resource set used for communication between the UE and the base station. Of course, transmission points in the embodiment of the present disclosure may further include a small station that does not have a radio resource scheduling function and participates in multiple points transmission, for example, an RRH.

In the embodiment of the present disclosure, a base station sends configuration information about a corresponding radio resource set used for communication with a UE to a radio communication node that participates in multiple points transmission. The radio resource sets used by the base station and the radio communication node do not intersect or radio resource sets used by a plurality of radio communication nodes do not intersect. In addition, a radio resource in a radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

Optionally, as an embodiment, a radio resource in a radio resource set may carry at least one of the following signs: an uplink or downlink sign, a sign of that the radio resource is used for physical data channel transmission, and/or a sign of that the radio resource is used for physical control channel transmission; a sign of an activation time of a radio resource, and the like, which may be specifically referred to the description in the foregoing embodiments.

Optionally, as another embodiment, cell identifiers of the base station and N radio communication nodes may be the same. Therefore, for a UE, a plurality of transmission points is equivalent to one cell, that is, multiple points transmission is transparent to the UE. A radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

Optionally, as another embodiment, before step 901, the base station may serve as a main coordination point to coordinate a third configuration parameter of the radio communication node, so as to determine a configuration parameter separately used by each radio communication node. The third configuration parameter may be referred to the description of the first configuration parameter in the foregoing embodiment.

Optionally, as another embodiment, before step 901, the base station can receive information about third configuration parameters of L radio communication nodes sent by an OAM device, and determine N radio communication nodes among the L radio communication nodes, where L is a positive integer and L≥N.

Optionally, as another embodiment, before step 901, one of the N radio communication nodes may serve as a main coordination point to coordinate third configuration parameters of other radio communication nodes. Specifically, the base station can receive information about third configuration parameters of Z1 radio communication nodes sent by the foregoing one of the N radio communication nodes, where Z1 is a positive integer and Z1≥N, and determine N radio communication nodes among the Z1 radio communication nodes to participate in multiple points transmission. The third configuration parameter coordination manner in which one of the N radio communication nodes serves as a main coordination point may be referred to the third configuration parameter coordination manner in which the base station serves as a main coordination point, which is no longer repeated herein.

Further, the base station can send an indication message of an identifier and/or service QoS of a UE for multiple points transmission to a radio communication node that participates in multiple points transmission. The service QoS of the UE is used for reference during resource coordination. The QoS parameter of the service at least includes one of bit rate information, service priority information, and a service type.

Optionally, as another embodiment, before step 901, the base station can determine N radio communication nodes that participate in multiple points transmission among N1 radio communication nodes according to a measurement report sent by a UE, where N1 is a positive integer and N1≥N. The base station can further determine N radio communication nodes according to a stored access record of the UE, and the access record includes an access frequency of the UE and/or a CSG cell of the UE, and the like. Further, the UE can carry in an RRC approximate indication message information of the CSG cell to report to the base station, which may be specifically referred to the description in the foregoing embodiments.

Therefore, the base station in the embodiment of the present disclosure determines a radio communication node that performs multiple points transmission for the UE and can select a more suitable transmission point to communicate with the UE.

It should be understood that the embodiment of the present disclosure does not limit the manner in which the base station determines a radio communication node that participates in multiple points transmission. It should be further noted that the embodiment of the present disclosure does not limit the sequence in which the base station determines N radio communication nodes that participate in multiple points transmission and coordinates resources.

Optionally, as another embodiment, the base station can send to the UE information of CSI feedback configuration of a periodic channel state information-reference signal CSI-RS.

Optionally, as another embodiment, before step 901, the base station can establish a radio resource control RRC connection with the UE.

In the embodiment of the present disclosure, because of multiple points transmission, downlink RRC signaling and/or data can be transmitted from a base station and/or radio communication node to a UE, and/or uplink RRC signaling and/or data can be received by the UE from the base station and/or radio communication node. As a preferable solution, a base station sends and receives RRC signaling or an SRB (specifically, the base station can perform transmission with the UE directly, or a radio communication node performs forwarding), so as to keep an RRC connection of a UE at a macro base station. When a UE crosses a coverage boundary of radio communication nodes under the coverage of the base station, the RRC connection is always kept at the base station, thereby avoiding a handover and reducing the number of handovers.

Optionally, as another embodiment, the radio communication node can perform segmentation processing, according to segmentation information fed back to an RLC entity by a MAC entity of the radio communication node, on transmission data at the RLC entity of the radio communication node.

Optionally, as another embodiment, a base station and one or more radio communication nodes, or a plurality of radio communication nodes may perform multiple points transmission for a UE. For example, a base station and a UE transmit RRC signaling and data DRB 1 on corresponding radio resources, and a radio communication node 104 and the UE transmit data DRB 2 on corresponding radio resources; or the base station and the UE transmit RRC signaling on corresponding radio resources, a radio communication node 102 and the UE transmit data DRB 1 on corresponding radio resources, and a radio communication node 103 and the UE transmit data DRB 2 on corresponding resources; or the base station and the UE transmit RRC signaling and data DRB 1 on corresponding radio resources, and the radio communication node 104 and the UE transmit data RRC signaling and data DRB 2 on corresponding radio resources; or an RRC connection is established between the base station and the UE, the radio communication node 102 and the UE transmit RRC signaling and data DRB 1 on corresponding radio resources, and the radio communication node 103 and the UE transmit data DRB 2 on corresponding resources. In addition, the base station may directly or may indirectly (for example, sends to a first radio communication node first) send an RRC message to the UE.

In addition, data sent by a UE to a base station or a radio communication node may be not modulated and encoded, and therefore, the size of a data packet is not increased. In this way, a bandwidth requirement on a backhaul link is also lowered.

Therefore, the base station and/or the radio communication node and the UE transmit data on an aggregated time domain resource (for example, a time slot or subframe); or the base station and/or the radio communication node and the UE transmit data on an aggregated frequency domain resource (for example, a PRB). In this way, a throughput of a UE can be effectively increased.

In addition, for an inter-frequency scenario, radio resource sets of all transmission points that participate in multiple points transmission may be time domain resource sets that do not intersect. Transmission points that participate in multiple points transmission may be a base station and at least one radio communication node, may also be a plurality of radio communication nodes, and may also include a small station that does not have a radio resource scheduling function and participates in multiple points transmission, for example, an RRH. A small station that does not have radio resource scheduling is connected to a base station or a radio communication node that has a radio resource scheduling function, and is scheduled by the base station or the radio communication node.

That a base station and one radio communication node serve as transmission points that participate in multiple points transmission is used as an example, the base station and the radio communication node have different frequencies, that is, the center frequencies of the working frequencies are different. The base station and the radio communication node perform coordination on a time domain, and then separately schedule a UE on corresponding time domain resources, so that a throughput of the UE is increased. Alternatively, when a base station with large coverage transmits RRC signaling and a radio communication node in a hotspot region transmits a DRB, the RRC signaling connection is always at the base station; therefore, the number of handovers can be reduced and handover performance is enhanced.

It should be understood that the foregoing solutions of performing coordination on a configuration parameter and determining participant radio communication nodes are also applied to an inter-frequency scenario, which are no longer repeated herein.

FIG. 10 is a flow chart of a communication method according to another embodiment of the present disclosure. A radio communication node (for example, the radio communication node 102 or the radio communication node 103 or the radio communication node 104 in FIG. 1) executes the method in FIG. 10, which corresponds to the method in FIG. 9, and therefore descriptions that repeated in the embodiment of FIG. 9 are properly omitted.

1001. A first radio communication node receives information that is about a fourth configuration parameter and sent by an operation, administration and maintenance OAM device; or, the first radio communication node determines a fourth configuration parameter according to a second coordination request message received from the base station, and sends information about the fourth configuration parameter to a base station, where the second coordination request message carries information about the fourth configuration parameter configured by the base station for communication between the first radio communication node and the UE, the fourth configuration parameter includes a first radio resource set used for communication between the first radio communication node and a user equipment UE, and a radio resource in the first radio resource set includes a time domain resource and/or a frequency domain resource.

1002. The first radio communication node communicates with the UE by scheduling the radio resource in the first radio resource set.

The first radio communication node is one of transmission points that communicate with the UE, the UE communicates with the transmission point by using a radio resource in a respective radio resource set of the transmission point, respective radio resource sets of the transmission point do not intersect, and the respective radio resource sets of the transmission point include the first radio resource set.

In other words, a radio resource of the first radio resource set is used for the first radio communication node to schedule the UE, and therefore, the first radio communication node has a radio resource scheduling function. The first radio resource set and radio resource sets used by other radio communication nodes that participate in multiple points transmission to separately communicate with the UE do not intersect. If the base station participates in multiple points transmission, the first radio resource set and the radio resource set used for communication between the base station and the UE do not intersect.

It should be understood that the embodiment of the present disclosure does not limit this. Of course, the embodiment of the present disclosure may further include a small station that does not have a radio resource scheduling function and participates in multiple points transmission, for example, an RRH.

In the embodiment of the present disclosure, a base station sends configuration information about a corresponding radio resource set used for communication with a UE to a radio communication node that participates in multiple points transmission. The radio resource sets used by the base station and the radio communication node do not intersect or radio resource sets used by a plurality of radio communication nodes do not intersect. In addition, a radio resource in a radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE through scheduling a radio resource thereof; therefore, a delay requirement on a backhaul link is lowered. In addition, radio resource sets used by the base station and the radio communication node do not intersect or radio resource sets used by a plurality of radio communication nodes do not intersect; therefore, interference is avoided.

Optionally, as another embodiment, a fourth configuration parameter may further include at least one of the following: configuration of a reference signal, configuration of a control channel, a correspondence between a radio resource and a radio bearer, a correspondence between a radio resource and an EPS bearer, scrambling code parameter configuration, node identifiers of N radio communication nodes, and CSI feedback configuration of a periodic channel state information-reference signal CSI-RS, and the like. The reference signal may include at least one of the following: a CSI-RS, a DMRS, an SRS, and the like.

Optionally, as another embodiment, the base station sends an identifier of the UE to the first communication node. For example, the base station can carry the identifier of the UE in the second coordination request message.

Optionally, as another embodiment, the second coordination request message carries information about a fourth configuration parameter configured by the base station for communication between a first radio communication node and a UE. The fourth configuration parameter coordination manner in which the base station serves as a main coordination point is as described above, which is no longer repeated herein.

Optionally, as another embodiment, when another radio communication node (a second radio communication node) that participates in multiple points transmission serves as a main coordination point to coordinate resources, a first radio communication node can determine a fourth configuration parameter according to a coordination request message sent by the second radio communication node. Further, the coordination request message carries information about a fourth configuration parameter configured for communication between the first radio communication node and a UE. Alternatively, the coordination request message sent by the second radio communication node may further carry an indication message of an identifier and/or service QoS of a UE. The service QoS of the UE is used for reference during resource coordination. The QoS parameter of the service at least includes one of bit rate information, service priority information, and a service type.

Optionally, as another embodiment, the first radio communication node may serve as a main coordination point to determine information about a fourth configuration parameter. The fourth configuration parameter coordination manner in which the first radio communication node serves as the main coordination point can be referred to the foregoing fourth configuration parameter coordination manner in which the base station serves as the main coordination point, which is no longer repeated herein.

It should be understood that the foregoing examples are only exemplary, and the embodiment of the present disclosure does not limit the fourth configuration parameter coordination manner.

Optionally, as another embodiment, the first radio communication node can perform segmentation processing, according to segmentation information fed back to an RLC entity by a MAC entity of the first radio communication node, on transmission data at the RLC entity of the first radio communication node.

Optionally, as another embodiment, a base station and a first radio communication node, a base station and multiple radio communication nodes, or a plurality of radio communication nodes (the first radio communication node is one of the plurality of radio communication nodes) may perform multiple points transmission for a UE. The embodiment in which a base station or a radio communication node and a UE transmit data and/or signaling is as described above, which is no longer repeated herein.

Therefore, the base station and/or the radio communication node and the UE transmit data on an aggregated time domain resource (for example, a time slot or subframe); or the base station and/or the radio communication node and the UE transmit data on an aggregated frequency domain resource (for example, a PRB). In this way, a throughput of a UE can be effectively increased.

In addition, for an inter-frequency scenario, the radio resource sets of all transmission points that participate in multiple points transmission may be time domain resource sets that do not intersect. Transmission points that participate in multiple points transmission may be a base station and at least one radio communication node, and may also be a plurality of radio communication nodes. By taking an example in which a base station and a first radio communication node serve as transmission points that participate in multiple points transmission, the base station and the first radio communication node have different frequencies, that is, the center frequencies of the working frequencies are different. The base station and the first radio communication node perform coordination on a time domain, and then separately schedule a UE on corresponding time domain resources, so that a throughput of the UE is increased. Alternatively, when a base station with large coverage transmits RRC signaling and a radio communication node in a hotspot region transmits a DRB, the RRC signaling connection is always at the base station; therefore, the number of handovers can be reduced and handover performance is enhanced.

It should be understood that the foregoing solutions of performing coordination on the configuration parameter and determining participant radio communication nodes are also applicable to an inter-frequency scenario, which are no longer repeated herein.

Figure 11:
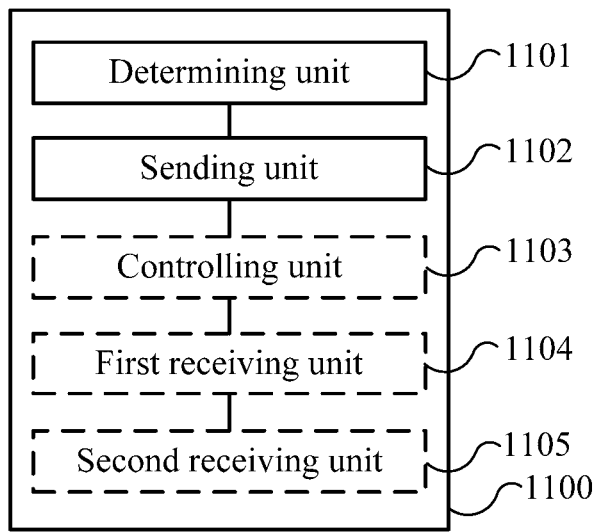
FIG. 11 is a structural block diagram of a base station according to an embodiment of the present disclosure.

FIG. 11 is a structural block diagram of a base station according to an embodiment of the present disclosure. The base station in this embodiment can execute the steps in the foregoing method embodiments, and the eNB 101 in FIG. 11 is an example of the base station. The base station of FIG. 11 includes a determining unit 1101 and a sending unit 1102.

The determining unit 1101 is configured to determine first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource.

The sending unit 1102 is configured to send the first resource configuration information determined by the determining unit to the UE, so that the UE communicates with the corresponding radio communication node by using the radio resource in the N radio resource sets, where the UE communicates with a corresponding transmission point by using a respective radio resource set of the transmission point, respective radio resource sets of the transmission points do not intersect, the respective radio resource sets of the transmission points include the N radio resource sets, and the transmission points include the N radio communication nodes.

In the foregoing solution, a base station delivers to a UE configuration information of a radio resource set used by a radio communication node that participates in multiple points transmission. Radio resource sets used by a base station and a radio communication node do not intersect or radio resource sets used by a plurality of radio communication nodes do not intersect, and a radio resource in a radio resource set is used for a radio communication node corresponding to the radio resource set to schedule a UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

Optionally, the base station may further include a controlling unit 1103, configured to control the sending unit to communicate with the UE, where the respective radio resource sets of the transmission points further include a radio resource set used for communication between the UE and the base station. Of course, transmission points in the embodiment of the present disclosure may further include a small station that does not have a radio resource scheduling function and participates in multiple points transmission, for example, an RRH.

The base station 1100 can implement operations related to a base station in the embodiments in FIG. 2 to FIG. 8, which is no longer described in detail to avoid repetition.

Optionally, as another embodiment, the sending unit 1102 is further configured to: separately send corresponding information about a first configuration parameter to N radio communication nodes, where the first configuration parameter includes at least one of the following: a radio resource set, configuration of a reference signal, configuration of a control channel, a correspondence between a radio resource and a radio bearer, a correspondence between a radio resource and an EPS bearer, scrambling code parameter configuration, and node identifiers of N radio communication nodes, which may be specifically referred to the description in the foregoing embodiments.

Optionally, as another embodiment, the sending unit 1102 is further configured to: separately send a corresponding first coordination request message to M1 radio communication nodes. The base station 1100 further includes: a first receiving unit 1104, configured to receive information about first configuration parameters determined and sent by M2 radio communication nodes among the M1 radio communication nodes according to the first coordination request message, where a first configuration parameter includes at least one of the following: a radio resource set, configuration of a reference signal, configuration of a control channel, a correspondence between a radio resource and a radio bearer, a correspondence between a radio resource and an EPS bearer, scrambling code parameter configuration, and node identifiers of N radio communication nodes. The determining unit 1101 is further configured to determine N radio communication nodes among the M2 radio communication nodes, where M1 and M2 are positive integers and M1≥M2≥N.

Optionally, as another embodiment, the base station 1100 further includes: a second receiving unit 1105, configured to receive information that is about first configuration parameters of L radio communication nodes and sent by an operation, administration and maintenance OAM device. The determining unit 1101 is further configured to: determine N radio communication nodes among the L radio communication nodes, where L is a positive integer and L≥N.

In the embodiment of the present disclosure, radio resources are coordinated, so that radio resource sets that are used when a transmission point that participates in multiple points transmission communicates with a UE that participate in multiple points transmission do not intersect, a scheduler in the base station or the radio communication node that participates in multiple points transmission schedules the UE on a corresponding radio resource, for example, sends downlink data to the UE accurately based on a moment scheduled by each scheduler. In this way, interference can be effectively eliminated. In addition, multiple points transmission is implemented for the UE, so that a throughput of the UE can be effectively increased.

It should be understood that the embodiment of the present disclosure does not limit the first configuration parameter coordination manner among transmission points, that is, any first configuration parameter coordination manner is applicable to the scope of the embodiment of the present disclosure.

Optionally, as another embodiment, the determining unit 1101 is further configured to: determine N radio communication nodes according to a measurement report sent by the UE, where the measurement report includes at least one of the following: signal strength of at least N radio communication nodes and signal quality of at least N radio communication nodes; or is further configured to: determine N radio communication nodes according to a moving speed of the UE, load of the N radio communication nodes, a quality of service QoS parameter of the UE and/or service information of the UE; or is further configured to: determine N radio communication nodes according to a stored access record of the UE, where the access record includes an access frequency of the UE and/or a closed subscriber group CSG cell of the UE.

Therefore, the base station in the embodiment of the present disclosure determines a radio communication node that performs multiple points transmission for the UE and can select a more suitable transmission point to communicate with the UE.

Optionally, the sending unit 1102 is further configured to: send to the UE at least one of the following information: first identifier information, instruction information, second identifier information, third identifier information, and information about scrambling code parameter configuration, which may be specifically referred to the description in the foregoing embodiments.

Optionally, as another embodiment, the controlling unit 1103 is configured to control the sending unit 1102 and the first receiving unit 1104, or control the sending unit 1102 and the second receiving unit 1105, to establish a radio resource control RRC connection with the UE. The sending unit 1102 is further configured to separately send a connection configuration parameter of the UE to the UE and the N radio communication nodes, where the connection configuration parameter is used for the UE to separately establish a user plane connection with the N radio communication nodes, and the connection configuration parameter at least includes a physical layer configuration parameter and a medium access control MAC layer configuration parameter.

Preferably, a base station sends and receives RRC signaling or an SRB (specifically, the base station and the UE can perform transmission directly or by means of a radio communication node), so as to keep an RRC connection of the UE at a macro base station. When a UE crosses a coverage boundary of radio communication nodes under the coverage of the base station, the RRC connection is always kept at the base station, thereby a handover is avoided and the number of handovers is reduced.

Therefore, the base station or the radio communication node and the UE transmit data on an aggregated time domain resource (for example, a time slot or subframe); or, the base station or the radio communication node and the UE transmit data on an aggregated frequency domain resource (for example, a physical resource block PRB). In this way, a throughput of a UE can be effectively increased.

Figure 12:
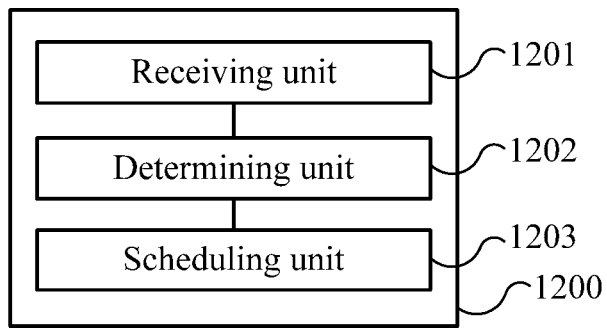
FIG. 12 is a structural block diagram of a radio communication node according to another embodiment of the present disclosure.

FIG. 12 is a structural block diagram of a radio communication node according to another embodiment of the present disclosure. The radio communication node in this embodiment can execute the steps in the foregoing method embodiments. The radio communication node 102, the radio communication node 103 or the radio communication node 104 in FIG. 1 is an example of the radio communication node in this embodiment. The radio communication node 1200 in FIG. 12 includes a receiving unit 1201 and a determining unit 1202.

The receiving unit 1201 is configured to receive information that is about a second configuration parameter and sent by a base station or an OAM device.

The determining unit 1202 is configured to determine a second configuration parameter according to the information that is about a second configuration parameter and received by the receiving unit 1201.

The scheduling unit 1203 is configured to communicate with a UE by scheduling a radio resource in a first radio resource set determined by the determining unit 1202.

The first radio communication node is one of transmission points that communicate with the UE. The UE communicates with the transmission point by using a radio resource in the respective radio resource set of the transmission point, respective radio resource sets of the transmission points do not intersect, and the respective radio resource sets of the transmission points include the first radio resource set.

In the embodiment of the present disclosure, radio resources are coordinated, so that radio resource sets used by a base station and a radio communication node do not intersect or radio resource sets used by a plurality of radio communication nodes do not intersect, and the base station or radio communication node that participates in multiple points transmission schedules the UE on a corresponding radio resource. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

The radio communication node 1200 can implement operations related to a radio communication node in the embodiments in FIG. 2 to FIG. 8, which is no longer described in detail to avoid repetition.

Figure 13:
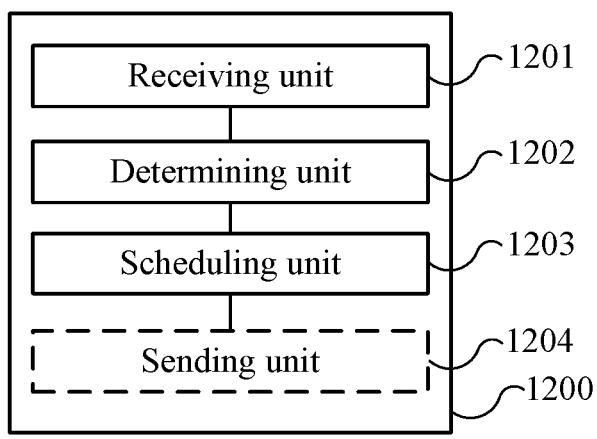
FIG. 13 is a structural block diagram of a radio communication node according to another embodiment of the present disclosure.

Optionally, as shown in FIG. 13, the foregoing radio communication node 1200 may further include a sending unit 1204.

The receiving unit 1201 is specifically configured to receive the information that is about a second configuration parameter and sent by the base station in the following manner: receiving a first coordination request message sent by the base station, where the first coordination request message carries the information about a second configuration parameter configured by the base station for communication between the first radio communication node and the UE.

The determining unit 1202 is specifically configured to determine a second configuration parameter according to the information that is about a second configuration parameter and received by the receiving unit 1201 in the following manner: determining a second configuration parameter according to the information about a second configuration parameter, where the information is carried in the first coordination request message and received by the receiving unit 1201.

The sending unit 1204 is configured to send to the base station information about the second configuration parameter determined by the determining unit.

As an embodiment, the receiving unit 1201 is further configured to: receive a connection configuration parameter of the UE sent by the base station, where the connection configuration parameter at least includes a physical layer configuration parameter and a medium access control MAC layer configuration parameter.

The determining unit is further configured to: establish a user plane connection with the UE by using the receiving unit 1201 and/or the sending unit 1204 according to the connection configuration parameter.

Figure 14:
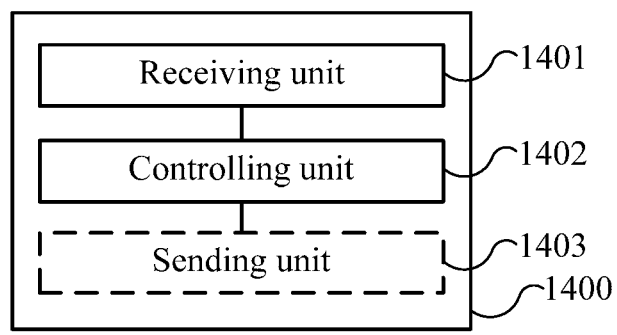
FIG. 14 is a structural block diagram of a user equipment according to another embodiment of the present disclosure.

FIG. 14 is a structural block diagram of a user equipment according to another embodiment of the present disclosure. The user equipment in this embodiment can execute the steps in the foregoing method embodiments. The UE 105 or the UE 106 in FIG. 14 is an example of the user equipment. The user equipment 1400 in FIG. 14 includes a receiving unit 1401 and a controlling unit 1402.

The UE can have one or more MAC entities. Preferably, the UE has a plurality of MAC entities, and each MAC entity performs scheduling during communication between the UE and one transmission point. It should be understood that the embodiment of the present disclosure does not limit this.

The receiving unit 1401 is configured to receive first resource configuration information sent by a base station.

The controlling unit 1402 is configured to:
acquire the first resource configuration information received by the receiving unit 1401, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource; and control the receiving unit 1401 to communicate with a transmission point by using a radio resource in a respective radio resource set of the transmission point, where respective radio resource sets of the transmission points do not intersect, the respective radio resource sets of the transmission points include the N radio resource sets, and the transmission points include the N radio communication nodes.

In the embodiment of the present disclosure, a UE receives configuration information that is about a radio resource set used by a radio communication node that participates in multiple points transmission and delivered by a base station. Radio resource sets used by the base station and the radio communication node do not intersect or radio resource sets used by a plurality of radio communication nodes do not intersect, and a radio resource in a radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but the radio communication node schedules a radio resource to communicate with the UE; therefore, a delay requirement on a backhaul link is lowered. In addition, radio resource sets used when a UE communicates with a base station and a radio communication node do not intersect or radio resource sets used when a UE communicates with a plurality of radio communication nodes do not intersect; therefore, interference is avoided.

The user equipment 1400 can implement operations related to a user equipment in the embodiments in FIG. 2 to FIG. 8, which is no longer described in detail to avoid repetition.

Optionally, as an embodiment, the user equipment 1400 further includes: a sending unit 1403, configured to send a measurement report to the base station, so that the base station determines N radio communication nodes according to the measurement report. The measurement report at least includes one of the following: signal strength of at least N radio communication nodes and signal quality of at least N radio communication nodes.

Therefore, the base station in the embodiment of the present disclosure determines radio communication nodes that perform multiple points transmission for the UE according to the measurement report sent by the UE and can select a more suitable transmission point to communicate with the UE.

Optionally, as an embodiment, the receiving unit 1401 is further configured to receive first identifier information sent by a base station, and the controlling unit 1402 is further configured to identify correspondences between N radio resource sets and reference signals used by the N radio communication nodes according to the first identifier information; and/or, the receiving unit 1401 is further configured to receive instruction information sent by a base station, and receive a corresponding control channel by using the instruction information according to the type of a control channel of the base station or the radio communication node; and/or, the receiving unit 1401 is further configured to receive second identifier information sent by a base station, and the controlling unit 1402 is further configured to map data of a transmission channel, a radio bearer or an EPS bearer to a corresponding radio resource according to the second identifier information, or map data acquired from a radio resource to a corresponding transmission channel, radio bearer or EPS bearer according to the second identifier information; and/or, the receiving unit 1401 is further configured to receive third identifier information sent by a base station, and the controlling unit 1402 is further configured to identify a base station and N radio communication nodes according to the third identifier information; and/or the receiving unit 1401 is further configured to receive scrambling code parameter configuration information sent by a base station, and the controlling unit 1402 is further configured to separately descramble a downlink reference signal or a downlink physical channel of the base station and/or N radio communication nodes according to the scrambling code parameter configuration information, and/or separately scramble an uplink reference signal or an uplink physical channel of the base station and/or N radio communication nodes according to the scrambling code parameter configuration information.

In addition, data sent by a UE to a base station or a radio communication node may be not modulated and encoded, and therefore, the size of a data packet is not increased. In this way, a bandwidth requirement on a backhaul link is also lowered.

Optionally, as another embodiment, the controlling unit 1402 is further configured to control the receiving unit and/or the sending unit to establish a radio resource control RRC connection with the base station, and separately establish a user plane connection with the N radio communication nodes according to a connection configuration parameter of the UE sent by the base station, where the connection configuration parameter at least includes a physical layer configuration parameter and a MAC layer configuration parameter.

Preferably, a base station sends and receives RRC signaling or an SRB (specifically, the base station and the UE can perform transmission directly, or the radio communication node performs forwarding), so as to keep an RRC connection of the UE at a macro base station. When a UE crosses a coverage boundary of radio communication nodes under the coverage of the base station, the RRC connection is always kept at the base station; therefore, a handover is avoided and the number of handovers is reduced.

Optionally, as another embodiment, the radio communication node can perform segmentation processing, according to segmentation information fed back to an RLC entity by a MAC entity of the radio communication node, on transmission data at the RLC entity of the radio communication node.

Therefore, the base station or the radio communication node and the UE transmit data on an aggregated time domain resource (for example, a time slot or subframe), or, the base station or the radio communication node and the UE transmit data on an aggregated frequency domain resource (for example, a PRB). In this way, a throughput of a UE can be effectively increased.

Figure 15:
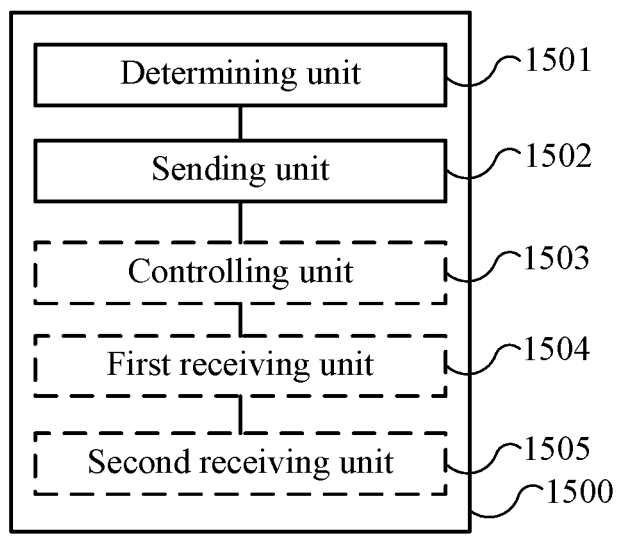
FIG. 15 is a structural block diagram of a base station according to an embodiment of the present disclosure.

FIG. 15 is a structural block diagram of a base station according to an embodiment of the present disclosure. The eNB 101 in FIG. 15 is an example of the base station. The base station of FIG. 15 includes a determining unit 1501 and a sending unit 1502.

The determining unit 1501 is configured to determine first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource.

The sending unit 1502 is configured to separately send configuration information of a corresponding radio resource set among the N radio resource sets to the N radio communication nodes, so that the N radio communication nodes schedule the radio resources in respective radio resource sets to communicate with the UE.

The UE communicates with a corresponding transmission point by using a respective radio resource set of the transmission point, respective radio resource sets of the transmission points do not intersect, the respective radio resource sets of the transmission points include the N radio resource sets, and the transmission points include the N radio communication nodes.

In the embodiment of the present disclosure, a base station sends configuration information about a corresponding radio resource set used for communication with a UE to a radio communication node that participates in multiple points transmission. Radio resource sets used by the base station and the radio communication node do not intersect or radio resource sets used by a plurality of radio communication nodes do not intersect. In addition, a radio resource in a radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore a delay requirement on a backhaul link is lowered. In addition, radio resource sets used by the base station and the radio communication node do not intersect or radio resource sets used by a plurality of radio communication nodes do not intersect; therefore, interference is avoided.

The base station 1500 can implement operations related to a base station in the embodiments in FIG. 9 to FIG. 10, which is no longer described in detail to avoid repetition.

Optionally, the base station further includes:
a controlling unit 1503, configured to control the sending unit 1502 to communicate with the UE, where the base station is one of the transmission points, the respective radio resource sets of the transmission points further include a radio resource set used for communication between the UE and the base station.

Optionally, as another embodiment, the sending unit 1502 is further configured to: send at least one of the corresponding following parameters to N radio communication nodes, respectively: configuration of a reference signal, configuration of a control channel, a correspondence between a radio resource and a radio bearer, a correspondence between a radio resource and an EPS bearer, scrambling code parameter configuration, node identifiers of N radio communication nodes, and CSI feedback configuration of a periodic channel state information-reference signal CSI-RS.

Optionally, as another embodiment, the sending unit 1502 is further configured to separately send a corresponding second coordination request message to M1 radio communication nodes. The base station 1500 further includes: a first receiving unit 1504, configured to receive information about third configuration parameters determined and sent by M2 radio communication nodes among the M1 radio communication nodes according to the second coordination request message, where the third configuration parameter includes at least one of the following: a radio resource set, configuration of a reference signal, configuration of a control channel, a correspondence between a radio resource and a radio bearer, a correspondence between a radio resource and an EPS bearer, scrambling code parameter configuration, node identifiers of N radio communication nodes, and CSI feedback configuration of a periodic channel state information-reference signal CSI-RS. The determining unit 1501 is further configured to determine N radio communication nodes among the M2 radio communication nodes, where M1 and M2 are positive integers and $M1 \geq M2 \geq N$.

Optionally, as another embodiment, the base station 1500 further includes: a second receiving unit 1505, configured to receive information that is about third configuration parameters of L radio communication nodes and sent by an OAM device. The determining unit 1501 further configured to determine N radio communication nodes among the L radio communication nodes, where L is a positive integer and $L \geq N$.

In the embodiment of the present disclosure, radio resources are coordinated, so that radio resource sets used for communication between a transmission point that participates in multiple points transmission and a UE do not intersect, a scheduler in a base station or a radio communication node that participates in multiple points transmission schedules the UE on a corresponding radio resource, for example, sends downlink data to the UE accurately based on a moment scheduled by each scheduler. In this way, interference can be effectively eliminated. In addition, multiple points transmission is performed for the UE; therefore, a throughput of the UE can be effectively increased.

It should be understood that the embodiment of the present disclosure does not limit the third configuration parameter coordination manner among transmission points, that is, any third configuration parameter coordination manner is applicable to the scope of the embodiment of the present disclosure.

Optionally, as another embodiment, the determining unit 1501 is further configured to: determine N radio communication nodes according to a measurement report sent by the UE, where the measurement report includes at least one of the following: signal strength of at least N radio communication nodes and signal quality of at least N radio communication nodes; or is further configured to: determine N radio communication nodes according to a moving speed of the UE, load of the N radio communication nodes, a quality of service QoS parameter of the UE, and/or service information of the UE; or is further configured to: determine N radio communication nodes according to a stored access record of the UE, where the access record includes an access frequency of the UE and/or a closed subscriber group CSG cell of the UE.

Therefore, the base station in the embodiment of the present disclosure determines a radio communication node that performs multiple points transmission for the UE and can select a more suitable transmission point to communicate with the UE.

Optionally, as another embodiment, the sending unit 1502 is further configured to send information about periodic CSI-RS feedback configuration to the UE.

Optionally, as another embodiment, the sending unit 1502 is further configured to send an identifier of the UE to N radio communication nodes.

Figure 16:
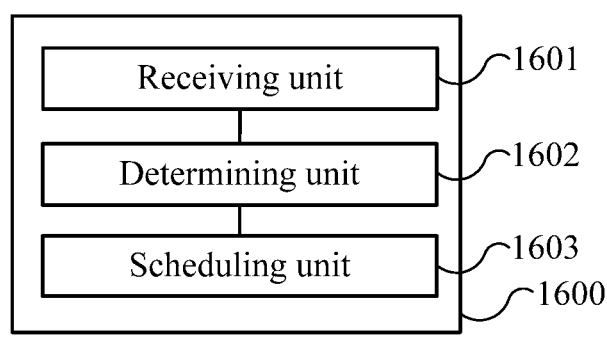
FIG. 16 is a structural block diagram of a radio communication node according to another embodiment of the present disclosure.

FIG. 16 is a structural block diagram of a radio communication node according to another embodiment of the present disclosure. The radio communication node 102, the radio communication node 103 or the radio communication node 104 in FIG. 1 is an example of the radio communication node. The radio communication node 1600 in FIG. 16 includes a receiving unit 1601 and a determining unit 1602.

The receiving unit 1601 is configured to receive information that is about a fourth configuration parameter and sent by a base station or an OAM device.

The determining unit 1602 is configured to determine a fourth configuration parameter according to the information that is about the fourth configuration parameter and received by the receiving unit 1601.

The scheduling unit 1603 is configured to communicate with a UE by scheduling a radio resource in a first radio resource set.

The fourth configuration parameter includes a first radio resource set used for communication between a first radio communication node and a user equipment UE, and a radio resource in the first radio resource set includes a time domain resource and/or a frequency domain resource. The first radio communication node is one of transmission points that communicate with the UE, the UE communicates with the transmission point by using a radio resource in a respective radio resource set of the transmission point, respective radio resource sets of the transmission points do not intersect, and the respective radio resource sets of the transmission points include the first radio resource set.

In the embodiment of the present disclosure, a base station sends configuration information about a corresponding radio resource set used for communication with a UE to a radio communication node that participates in multiple points transmission. Radio resource sets used by the base station and the radio communication node do not intersect or radio resource sets used by a plurality of radio communication nodes do not intersect. In addition, a radio resource in the radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore, a delay requirement on a backhaul link is lowered. In addition, radio resource sets used by the base station and the radio communication node do not intersect or radio resource sets used by a plurality of radio communication nodes do not intersect; therefore, interference is avoided.

The radio communication node 1600 can implement operations related to a radio communication node in the embodiments in FIG. 9 to FIG. 10, which is no longer described in detail to avoid repetition.

Optionally, as another embodiment, the fourth configuration parameter may further include at least one of the following: configuration of a reference signal, configuration of a control channel, a correspondence between a radio resource and a radio bearer, a correspondence between a radio resource and an EPS bearer, scrambling code parameter configuration, node identifiers of N radio communication nodes, and CSI feedback configuration of a periodic channel state information-reference signal CSI-RS. The reference signal may include at least one of the following: a CSI-RS, a DMRS, an SRS, and the like.

Optionally, as another embodiment, the base station sends an identifier of the UE to the first communication node. For example, the base station can carry the identifier of the UE in a second coordination request message.

Optionally, as another embodiment, the second coordination request message carries information about a fourth configuration parameter configured by the base station for communication between the first radio communication node and the UE.

Figure 17:
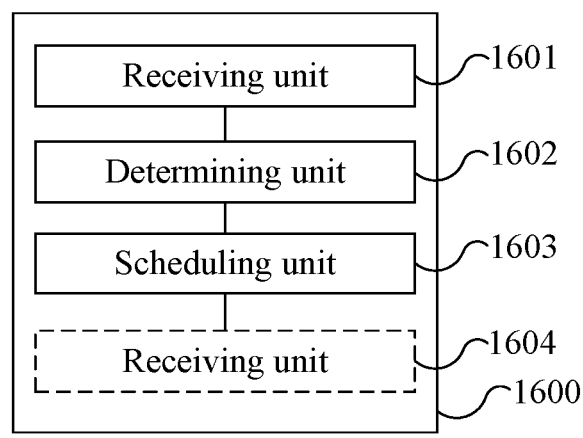
FIG. 17 is a structural block diagram of a radio communication node according to another embodiment of the present disclosure.

Optionally, as shown in FIG. 17, the radio communication node 1600 may further include a sending unit 1604.

The receiving unit 1601 is specifically configured to receive the information that is about a fourth configuration parameter and sent by the base station in the following manner: receiving, by the receiving unit 1601, a second coordination request message sent by the base station, where the second coordination request message carries the information about a second configuration parameter configured by the base station for communication between the first radio communication node and the UE.

The determining unit 1602 is specifically configured to determine a fourth configuration parameter according to the information that is about a fourth configuration parameter and received by the receiving unit 1601 in the following manner: determining the fourth configuration parameter according to the information about a fourth configuration parameter, where the information is carried in the second coordination request message and received by the receiving unit 1601.

The sending unit 1604 is configured to send the information about a fourth configuration parameter determined by the determining unit 1602 to the base station.

Figure 18:
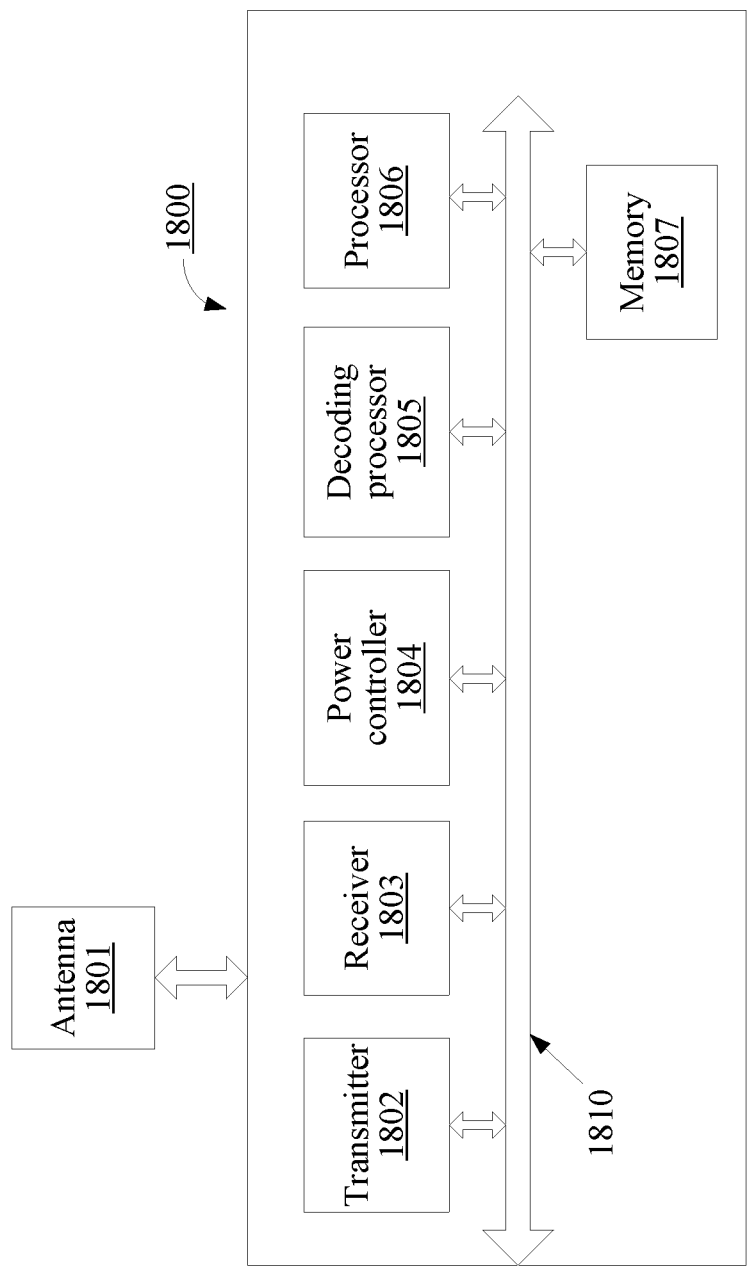
FIG. 18 is a block diagram of a device according to an embodiment of the present disclosure.

The embodiment of the present disclosure further provides apparatus embodiments for implementing the steps and methods in the foregoing method embodiments. The embodiments of the present disclosure are applicable to a user equipment, a base station or wireless communication in various communication systems. FIG. 18 shows a device embodiment. In the embodiment, a device 1800 includes a transmitter 1802, a receiver 1803, a power controller 1806, a decoding processor 1805, a processor 1806, a memory 1807, and an antenna 1801. The processor 1806 controls operations of the device 1800. The processor 1806 can further be referred to as a central processing unit CPU or a processor. The memory 1807 can include a read-only memory and a random access memory, and provide an instruction and data to the processor 1806. A part of the memory 1807 may further include a nonvolatile random access memory (NVRAM). In a specific application, the device 1800 can be inserted with or the device 1800 can be, for example, a radio communication device such as a mobile phone, and may further include the transmitter 1802 and the receiver 1803, so as to allow data transmission and reception between the device 1800 and a remote position. The transmitter 1802 and the receiver 1803 can be coupled to the antenna 1801. All components of the device 1800 are coupled by using a bus system 1810, where the bus system 1810 includes, in addition to a data bus, a power supply bus, a control bus, and a state signal bus. However, for clear illustration, various buses are all marked as the bus system 1810 in the drawings. The device 1800 may further include a processor 1806 configured to process a signal, and further include the power controller 1804 and the decoding processor 1805.

The foregoing methods disclosed in the embodiments of the present disclosure may use the device 1800, or in other words, are mainly implemented by the processor 1806 and the receiver 1803 in the device 1800. The processor 1806 may be an integrated circuit chip and has a signal processing capability. During the implementation, steps of the foregoing methods can be accomplished by using a hardware integrated logic circuit or software instructions in the processor 1806. To execute the methods disclosed in the embodiments of the present disclosure, the foregoing decoding processor may be a universal processor, a digital signal processor (DSP), an application-specific integrated circuit (ASIC), a field-programmable gate array (FPGA) or other programmable logic devices, discrete gates or transistor logic devices, discrete hardware assemblies. The methods, steps and logic block diagrams disclosed in the embodiments of the present disclosure can be implemented or executed. A universal processor may be a microprocessor or the processor may also be any conventional processor, decoder, and the like. The steps in the disclosed methods with reference to the embodiments of the present disclosure can be directly executed and completed by a hardware decoding processor, or are executed and completed by a combination of hardware and software modules in the decoding processor. The software modules can be located in a mature storage medium in the industry such a random memory, a flash memory, a read-only memory, a programmable read-only memory or an electrically erasable programmable memory and a register. The storage medium is located at the memory 1807, and the decode unit reads information in the memory 1807 and completes the steps in the foregoing methods in combination with the hardware thereof.

Figure 19:
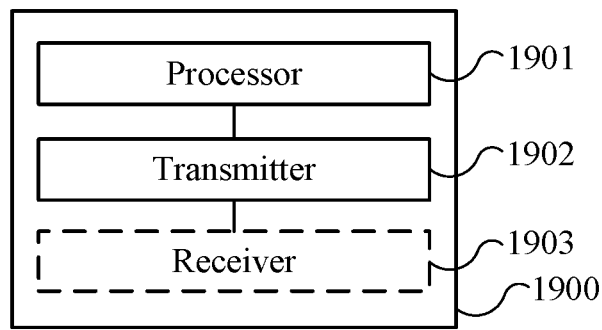
FIG. 19 is a structural block diagram of a base station according to an embodiment of the present disclosure.

Further, FIG. 19 is a structural block diagram of a base station according to an embodiment of the present disclosure. The base station in this embodiment can execute the steps in the foregoing method embodiments. The eNB 101 in FIG. 19 is an example of the base station. The base station in FIG. 19 includes a processor 1901 and a transmitter 1902.

The processor 1901 is configured to determine first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource.

The transmitter 1902 is configured to send the first resource configuration information determined by the processor 1901 to the UE, so that the UE communicates with the corresponding radio communication node by using the radio resource in the N radio resource sets, where the UE communicates with a corresponding transmission point by using a respective radio resource set of the transmission point, respective radio resource sets of the transmission points do not intersect, the respective radio resource sets of the transmission points include the N radio resource sets, and the transmission points include the N radio communication nodes.

In the foregoing solution, the base station delivers to the UE configuration information of a radio resource set used by a radio communication node that participates in multiple points transmission. Radio resource sets used by the base station and the radio communication node do not intersect or radio resource sets used by a plurality of radio communication nodes do not intersect, and a radio resource in a radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore a delay requirement on a backhaul link is lowered. In addition, radio resource sets used by the base station and the radio communication node do not intersect or radio resource sets used by a plurality of radio communication nodes do not intersect; therefore, interference is avoided.

The base station 1900 can implement operations related to a base station in the embodiments in FIG. 2 to FIG. 8, which is no longer described in detail to avoid repetition.

Optionally, the processor 1901 is further configured to control the transmitter 1902 to communicate with the UE, where the respective radio resource sets of the transmission points further include a radio resource set used for communication between the UE and the base station.

Optionally, as another embodiment, the transmitter 1902 is further configured to: separately send corresponding information about a first configuration parameter to N radio communication nodes, where the first configuration parameter includes at least one of the following: a radio resource set, configuration of a reference signal, configuration of a control channel, a correspondence between a radio resource and a radio bearer, a correspondence between a radio resource and an EPS bearer, scrambling code parameter configuration, and node identifiers of N radio communication nodes.

Optionally, as another embodiment, the transmitter 1902 is further configured to: separately send a corresponding first coordination request message to M1 radio communication nodes. The base station 1100 further includes: a receiver 1903, configured to receive information about first configuration parameters determined and sent by M2 radio communication nodes among the M1 radio communication nodes according to the first coordination request message, where the details of the first configuration parameter are referred to the description in the foregoing embodiments. The processor 1901 is further configured to determine N radio communication nodes among the M2 radio communication nodes, where M1 and M2 are positive integers and M1≥M2≥N.

Optionally, as another embodiment, the receiver 1903 is further configured to receive information that is about first configuration parameters of L radio communication nodes and sent by an OAM device. The processor 1901 is further configured to: determine N radio communication nodes among the L radio communication nodes, where L is a positive integer and L≥N.

In the embodiment of the present disclosure, radio resources are coordinated, so that radio resource sets used for communication between a transmission point that participates in multiple points transmission and a UE do not intersect, and a scheduler in a base station or a radio communication node that participates in multiple points transmission schedules the UE on a corresponding radio resource, for example, sends downlink data to the UE accurately based on the moment scheduled by each scheduler. In this way, interference can be effectively eliminated. In addition, multiple points transmission is performed for the UE, so that a throughput of the UE can be effectively increased.

It should be understood that the embodiment of the present disclosure does not limit the first configuration parameter coordination manner among the transmission points, that is, any first configuration parameter coordination manner is applicable to the scope of the embodiment of the present disclosure.

Optionally, as another embodiment, the processor 1901 is further configured to: determine N radio communication nodes according to a measurement report sent by the UE, where the measurement report includes at least one of the following: signal strength of at least N radio communication nodes and signal quality of at least N radio communication nodes; or is further configured to: determine N radio communication nodes according to a moving speed of the UE, load of the N radio communication nodes, a quality of service QoS parameter of the UE, and/or service information of the UE; or is further configured to: determine N radio communication nodes according to a stored access record of the UE, where the access record includes an access frequency of the UE and/or a closed subscriber group CSG cell of the UE.

Therefore, the base station in the embodiment of the present disclosure determines a radio communication node that performs multiple points transmission for the UE and can select a more suitable transmission point to communicate with the UE.

Optionally, the transmitter 1902 is further configured to: send to the UE at least one of the following information: first identifier information, instruction information, second identifier information, third identifier information, and information about scrambling code parameter configuration. The details are referred to the description in the foregoing embodiments.

Optionally, as another embodiment, the processor 1901 is further configured to control the transmitter 1902 and/or the receiver 1903 to establish a radio resource control RRC connection with the UE. The transmitter 1902 is further configured to: separately send a connection configuration parameter of the UE to the UE and N radio communication nodes, where the connection configuration parameter is used for the UE to separately establish a user plane connection with the N radio communication nodes, and the connection configuration parameter at least includes a physical layer configuration parameter and a medium access control MAC layer configuration parameter.

Preferably, a base station sends and receives RRC signaling or an SRB (specifically, the base station and the UE can perform transmission directly or by means of a radio communication node), so as to keep an RRC connection of the UE at a macro base station. When a UE crosses a coverage boundary of radio communication nodes under the coverage of the base station, the RRC connection is always kept at the base station; therefore, a handover is avoided and the number of handovers is reduced.

Therefore, the base station or the radio communication node and the UE transmit data on an aggregated time domain resource (for example, a time slot or subframe), or, the base station or the radio communication node and the UE transmit data on an aggregated frequency domain resource (for example, a physical resource block PRB). In this way, a throughput of a UE can be effectively increased.

Figure 20:
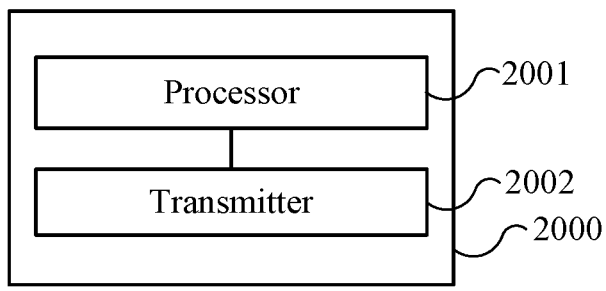
FIG. 20 is a structural block diagram of a radio communication node according to another embodiment of the present disclosure.

FIG. 20 is a structural block diagram of a radio communication node according to another embodiment of the present disclosure. The radio communication node in this embodiment can execute the steps in the foregoing method embodiments. The radio communication node 102, the radio communication node 103 or the radio communication node 104 in FIG. 1 is an example of the radio communication node. The radio communication node 2000 in FIG. 20 includes a receiver 2001 and a processor 2002.

The receiver 2001 is configured to receive information that is about a second configuration parameter and sent by a base station or an OAM device.

The processor 2002 is configured to:
  determine a second configuration parameter according to the information that is about a second configuration parameter and received by the receiver 2001, where the second configuration parameter includes a first radio resource set used for communication between a first radio communication node and a user equipment UE, and a radio resource in the first radio resource set includes a time domain resource and/or a frequency domain resource; and
  communicate with the UE by scheduling the radio resource in the first radio resource set, where the first radio communication node is one of transmission points that communicate with the UE, the UE communicates with the transmission point by using a radio resource in a respective radio resource set of the transmission point, respective radio resource sets of the transmission points do not intersect, and the respective radio resource sets of the transmission points include the first radio resource set.

In the embodiment of the present disclosure, radio resources are coordinated, so that radio resource sets used by a base station and a radio communication node do not intersect or radio resource sets used by a plurality of radio communication nodes do not intersect, and the base station or radio communication node that participates in multiple points transmission schedules the UE on a corresponding radio resource. In this way, as a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but communicates with the UE by scheduling a radio resource; therefore a delay requirement on a backhaul link is lowered. In addition, radio resource sets used by the base station and the radio communication node do not intersect or radio resource sets used by a plurality of radio communication nodes do not intersect; therefore, interference is avoided.

The radio communication node 2000 can implement operations related to a radio communication node in the embodiments in FIG. 2 to FIG. 8, which is no longer described in detail to avoid repetition.

Figure 21:
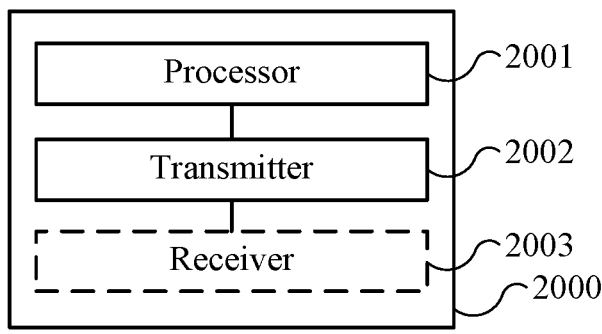
FIG. 21 is a structural block diagram of a radio communication node according to another embodiment of the present disclosure.

Optionally, as shown in FIG. 21, the radio communication node 2000 may further include a transmitter 2003.

The receiver 2001 is specifically configured to receive the information that is about a second configuration parameter and sent by the base station in the following manner: receiving a first coordination request message sent by the base station, where the first coordination request message carries the information about a second configuration parameter configured by the base station for communication between the first radio communication node and the UE.

The processor 2002 is specifically configured to determine a second configuration parameter according to the information that is about a second configuration parameter and received by the receiver 2001 in the following manner: determining the second configuration parameter according to the information about a second configuration parameter, where the information is carried in the first coordination request message and received by the receiver 2001.

The transmitter 2003 is configured to send the information about a second configuration parameter determined by the processor 2002 to the base station.

Optionally, as an embodiment, the receiver 2001 is further configured to receive a connection configuration parameter of the UE sent by the base station, where the connection configuration parameter at least includes a physical layer configuration parameter and a MAC layer configuration parameter. The processor 2101 is further configured to: control the receiver 2001 and/or the transmitter 2003 to establish a user plane connection with the UE according to the connection configuration parameter.

Figure 22:
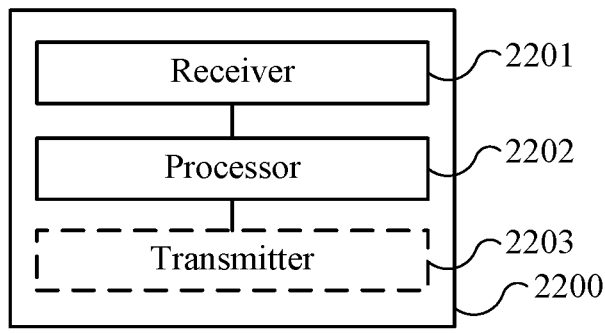
FIG. 22 is a structural block diagram of a user equipment according to another embodiment of the present disclosure.

FIG. 22 is a structural block diagram of a user equipment according to another embodiment of the present disclosure. The user equipment in this embodiment can execute the steps in the foregoing method embodiments. The UE 105 or the UE 106 in FIG. 1 is an example of the user equipment. The user equipment 2200 in FIG. 22 includes a receiver 2201 and a processor 2202.

The UE can have one or more MAC entities. Preferably, the UE has a plurality of MAC entities, and each MAC entity performs scheduling during communication between the UE and one transmission point. It should be understood that the embodiment of the present disclosure does not limit this.

The receiver 2201 is configured to receive first resource configuration information sent by a base station.

The processor 2202 is configured to:
  acquire the first resource configuration information received by the receiver 2201, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource; and
  control the receiver 2201 to communicate with a transmission point by using a radio resource in a respective radio resource set of the transmission point, where respective radio resource sets of the transmission points do not intersect, the respective radio resource sets of the transmission points include the N radio resource sets, and the transmission points include the N radio communication nodes.

In the embodiment of the present disclosure, a UE receives configuration information that is delivered by a base station and about radio resource sets used by radio communication nodes that participate in multiple points transmission. Radio resource sets used by the base station and the radio communication node do not intersect or radio resource sets used by a plurality of radio communication nodes do not intersect, and a radio resource in a radio resource set is used for a radio communication node corresponding to the radio resource set to schedule the UE. In this way, a radio communication node is capable of scheduling a radio resource, that is, has a resource scheduling function, and a radio communication node, during communication between a UE and a radio communication node, does not need to receive, by using a backhaul link, a scheduling command sent by the base station to communicate with the UE, but the radio communication node schedules a radio resource to communicate with the UE; therefore, a delay requirement on a backhaul link is lowered. In addition, radio resource sets used when a UE communicates with a base station and a radio communication node do not intersect or radio resource sets used when a UE communicates with a plurality of radio communication nodes do not intersect; therefore, interference is avoided.

The user equipment 2200 can implement operations related to a user equipment in the embodiments in FIG. 2 to FIG. 8, which is no longer described in detail to avoid repetition.

Optionally, as an embodiment, the user equipment 2200 further includes: a transmitter 2203, configured to send a measurement report to the base station, so that the base station determines the N radio communication nodes according to the measurement report. The measurement report at least includes one of the following: signal strength of at least N radio communication nodes and signal quality of the at least N radio communication nodes.

Therefore, the base station in the embodiment of the present disclosure determines a radio communication node that performs multiple points transmission for the UE according to the measurement report sent by the UE and can select a more suitable transmission point to communicate with the UE.

Optionally, as an embodiment, the receiver 2201 is further configured to receive first identifier information sent by the base station. The processor 2202 is further configured to identify correspondences between N radio resource sets and reference signals used by the N radio communication nodes according to the first identifier information; and/or, the receiver 2201 is further configured to receive instruction information sent by the base station, and receive a corresponding control channel by using the instruction information according to the type of a control channel of the base station or the radio communication node; and/or, the receiver 2201 is further configured to receive second identifier information sent by the base station, and the processor 2202 is further configured to map data of the transmission channel, radio bearer or EPS bearer to a corresponding radio resource according to the second identifier information, or map data acquired from the radio resource to a corresponding transmission channel, radio bearer or EPS bearer according to the second identifier information; and/or, the receiver 2201 is further configured to receive third identifier information sent by the base station, and the processor 2202 is further configured to identify the base station and the N radio communication nodes according to the third identifier information; and/or, the receiver 2201 is further configured to receive information about scrambling code parameter configuration sent by the base station, and the processor 2202 is further configured to separately descramble a downlink reference signal or a downlink physical channel of the base station and/or the N radio communication nodes according to the information about scrambling code parameter configuration, and/or separately scramble an uplink reference signal or an uplink physical channel of the base station and/or the N radio communication nodes according to the information about scrambling code parameter configuration.

In addition, data sent by a UE to the base station or a radio communication node may be not modulated and encoded, and therefore, a size of a data packet is not increased. Therefore, a bandwidth requirement on a backhaul link is also lowered.

Optionally, as another embodiment, the processor 2202 is further configured to establish a radio resource control RRC connection with the base station, and separately establish a user plane connection with the N radio communication nodes according to the connection configuration parameter of the UE sent by the base station, where the connection configuration parameter at least includes a physical layer configuration parameter and a MAC layer configuration parameter.

Optionally, the base station sends and receives RRC signaling or an SRB (specifically, the base station and the UE can perform transmission directly or perform transmission by using the radio communication node), so as to keep an RRC connection of the UE at a macro base station. When a UE crosses a coverage boundary of radio communication nodes under coverage of the base station, as the RRC connection is always kept at the base station, a handover is avoided and the number of handovers is lowered.

Optionally, as another embodiment, the radio communication node can perform segmentation processing, according to segmentation information fed back to an RLC entity by a MAC entity of the first radio communication node, on transmission data at the RLC entity of the radio communication node.

Therefore, the base station or the radio communication node and the UE perform data transmission on an aggregated time domain resource (for example, a time slot or subframe), or, the base station or the radio communication node and the UE perform data transmission on an aggregated frequency domain resource (for example, a physical resource block PRB). Therefore, a throughput of the UE can be effectively increased.

Figure 23:
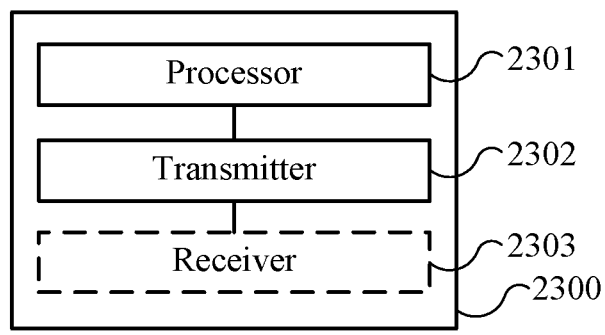
FIG. 23 is a structural block diagram of a base station according to an embodiment of the present disclosure.

FIG. 23 is a structural block diagram of a base station according to an embodiment of the present disclosure. The base station can execute steps in the foregoing method embodiments. The eNB 101 in FIG. 1 is an example of the base station in this embodiment. The base station in FIG. 23 includes a processor 2301 and a transmitter 2302.

The processor 2301 is configured to determine first resource configuration information, where the first resource configuration information is used for indicating N radio resource sets that are used when N radio communication nodes separately perform communication with a user equipment UE, N is a positive integer, a radio resource in each radio resource set among the N radio resource sets is used for the radio communication node corresponding to each radio resource set to schedule the UE, and the radio resource includes a time domain resource and/or a frequency domain resource.

The transmitter 2302 is configured to separately send configuration information of a corresponding radio resource set among the N radio resource sets to the N radio communication nodes, so that the N radio communication nodes schedule radio resources in respective radio resource sets to communicate with the UE.

The UE communicates with a corresponding transmission point by using respective radio resource sets of transmission points, where the respective radio resource sets of the transmission points do not intersect, the respective radio resource sets of the transmission points include the N radio resource sets, and the transmission points include the N radio communication nodes. Of course, the transmission points in the embodiment of the present disclosure may further include a small station that does not have a radio resource scheduling function to participate in multiple points transmission, for example, an RRH.

In the embodiment of the present disclosure, a base station sends configuration information about a corresponding radio resource set used for communication with a UE to a radio communication node that participates in multiple points transmission. Radio resource sets used by the base station and the radio communication node do not intersect or radio resource sets used by a plurality of radio communication nodes do not intersect. In addition, a radio resource in the radio resource set is used for a radio communication node corresponding to the radio resource set to schedule the UE. Therefore, as a radio communication node can schedule a radio resource, that is, has a resource scheduling function, during communication between the UE and the radio communication node, the radio communication node does not need to receive, through a backhaul link, a scheduling command sent by the base station to communicate with the UE, but communicates with the UE by scheduling a radio resource, thereby lowering a delay requirement on a backhaul link. In addition, as radio resource sets used by the base station and the radio communication node do not intersect or radio resource sets used by a plurality of radio communication nodes do not intersect, interference is avoided.

The base station 2300 can implement operations related to a base station in the embodiments in FIG. 9 to FIG. 10, which is no longer described in detail to avoid repetition.

Optionally, the processor 2301 is further configured to control the transmitter 2302 to communicate with the UE, where the base station is one of the transmission points, and the respective radio resource sets of the transmission points further include a radio resource set used for communication between the UE and the base station.

Optionally, as another embodiment, the transmitter 2302 is further configured to: separately send to the N radio communication nodes at least one of the corresponding following parameters: configuration of a reference signal, configuration of a control channel, a mapping between a radio resource and a radio bearer, a correspondence between a radio resource and an EPS bearer, scrambling code parameter configuration, node identifiers of N radio communication nodes, and periodic CSI feedback configuration that is based on a channel state information-reference signal CSI-RS and is of the UE.

Optionally, as another embodiment, the transmitter 2302 is further configured to send a corresponding second coordination request message to M1 radio communication nodes separately. The base station 2300 further includes: a receiver 2303, configured to receive information about a third configuration parameter determined and sent by M2 radio communication nodes among the M1 radio communication nodes according to the second coordination request message. The processor 2301 is further configured to determine the N radio communication nodes among the M2 radio communication nodes, where M1 and M2 are positive integers and M1≥M2≥N.

Optionally, as another embodiment, the receiver 2303 is configured to receive the information that is about the third configuration parameter of L radio communication nodes and sent by an OAM device. The processor 2301 is further configured to determine the N radio communication nodes among the L radio communication nodes, where L is a positive integer and L≥N.

For the third configuration parameter, reference may be made to the description in the foregoing embodiments.

In the embodiment of the present disclosure, radio resources are coordinated, so that radio resource sets used when a transmission point that participates in multiple points transmission communicates with a UE do not intersect, and a scheduler in the base station or the radio communication node that participates in multiple points transmission schedules the UE on a corresponding radio resource, for example, downlink data is sent to the UE accurately according to time scheduled by each scheduler. Therefore, interference can be effectively eliminated. In addition, the UE adopts multiple points transmission, so that a throughput of the UE can be effectively increased.

It should be understood that a coordination manner for a first configuration parameter among the transmission points is not limited in the embodiment of the present disclosure, that is, any manner for coordination of the first configuration parameter can be applied to the scope of the embodiment of the present disclosure.

Optionally, as another embodiment, the processor 2301 is further configured to: determine the N radio communication nodes according to a measurement report sent by the UE, where the measurement report includes at least one of the following: signal strength of at least N radio communication nodes and signal quality of the at least N radio communication nodes; or is further configured to: determine the N radio communication nodes according to a moving speed of the UE, load of the N radio communication nodes, a quality of service QoS parameter of the UE, and/or service information of the UE; or is further configured to: determine the N radio communication nodes according to a stored access record of the UE, where the access record includes an access frequency of the UE and/or a closed subscriber group CSG cell of the UE.

Therefore, in the embodiment of the present disclosure, the base station determines a radio communication node that performs multiple points transmission for the UE and can select a more suitable transmission point to communicate with the UE.

Optionally, as another embodiment, the transmitter 2302 is further configured to send information about periodic CSI-RS feedback configuration to the UE.

Optionally, as another embodiment, the transmitter 2302 is further configured to send an identifier of the UE to the N radio communication nodes.

Figure 24:
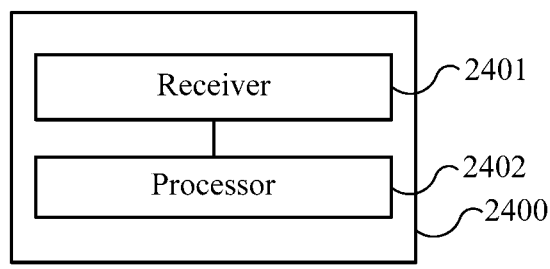
FIG. 24 is a structural block diagram of a radio communication node according to another embodiment of the present disclosure.

FIG. 24 is a structural block diagram of a radio communication node according to another embodiment of the present disclosure. The radio communication node can execute steps in the foregoing method embodiments. The radio communication node 102, the radio communication node 103 or the radio communication node 104 in FIG. 1 is an example of the radio communication node. A radio communication node 2400 in FIG. 24 includes a receiver 2401 and a processor 2402.

The receiver 2401 is configured to receive information that is about a fourth configuration parameter and sent by a base station or an OAM device.

The processor 2402 is configured to:
determine a fourth configuration parameter according to the information that is about the fourth configuration parameter and received by the receiver 2401, where the fourth configuration parameter includes a first radio resource set used for communication between a first radio communication node and a user equipment UE, a radio resource in the first radio resource set includes a time domain resource and/or a frequency domain resource, and the radio resource in the first radio resource set is used for the first radio communication node to schedule the UE; and schedule the radio resource in the first radio resource set to communicate with the UE, where the first radio communication node is one of transmission points that communicate with the UE, the UE communicates with the transmission points by using a radio resource in the respective radio resource sets of transmission points, the respective radio resource sets of the transmission points do not intersect, and the respective radio resource sets of the transmission points include the first radio resource set.

In the embodiment of the present disclosure, the base station sends configuration information about a corresponding radio resource set used for communication with a UE to a radio communication node that participates in multiple points transmission. The radio resource sets used by the base station and the radio communication node do not intersect or radio resource sets used by a plurality of radio communication nodes do not intersect. In addition, a radio resource in the radio resource set is used for a radio communication node corresponding to the radio resource set to schedule the UE. Therefore, as a radio communication node can schedule a radio resource, that is, has a resource scheduling function, during communication between the UE and the radio communication node, the radio communication node does not need to receive, through a backhaul link, a scheduling command sent by the base station to communicate with the UE, but communicates with the UE by scheduling a radio resource, thereby lowering a delay requirement on a backhaul link. In addition, as radio resource sets used by the base station and the radio communication node do not intersect or radio resource sets used by a plurality of radio communication nodes do not intersect, interference is avoided.

The radio communication node 2400 can implement operations related to the radio communication node in the embodiments in FIG. 9 and FIG. 10, which is no longer described in detail to avoid repetition.

Optionally, as another embodiment, the fourth configuration parameter may further include at least one of the following: configuration of a reference signal, configuration of a control channel, a correspondence between a radio resource and a radio bearer, a correspondence between a radio resource and an EPS bearer, scrambling code parameter configuration, node identifiers of N radio communication nodes, and periodic CSI feedback configuration that is based on a channel state information-reference signal CSI-RS and is of the UE. The reference signal may include at least one of the following: a CSI-RS, a DMRS, an SRS, and the like.

Optionally, as another embodiment, the base station sends an identifier of the UE to the first communication node. For example, the base station can carry the identifier of the UE in a second coordination request message.

Optionally, as another embodiment, the second coordination request message carries information about a fourth configuration parameter configured by the base station for communication between a first radio communication node and a UE.

Optionally, as another embodiment, the radio communication node can perform segmentation processing, according to segmentation information fed back to an RLC entity by a MAC entity of the first radio communication node, on transmission data at an RLC entity of the radio communication node.

Figure 25:
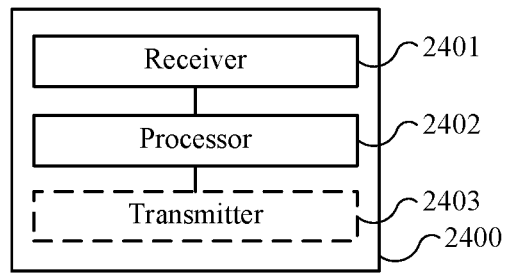
FIG. 25 is a structural block diagram of a radio communication node according to another embodiment of the present disclosure.

Optionally, as shown in FIG. 25, the radio communication node 2400 in this embodiment may further include a transmitter 2403.

The receiver 2401 is specifically configured to receive the information that is about a fourth configuration parameter and sent by the base station in the following manner: receiving, by the receiver 2401, a second coordination request message sent by the base station, where the second coordination request message carries the information about a second configuration parameter configured by the base station for communication between the first radio communication node and the UE.

The processor 2402 is specifically configured to determine the fourth configuration parameter according to the information that is about the fourth configuration parameter and received by the receiver 2401 in the following manner: determining the fourth configuration parameter according to the information about the fourth configuration parameter, where the information is carried in the second coordination request message and received by the receiver 2401.

The transmitter 2403 is configured to send to the base station the information about the fourth configuration parameter determined by the processor 2402.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer to readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present disclosure. The foregoing storage medium includes: any medium that can store program codes, such as a USB flash disk, a removable hard disk, a read to only memory (ROM), a random access memory (RAM), a magnetic disk, or an optical disk.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method, comprising:
    receiving, by a radio communication node, resource configuration information from a base station, wherein the resource configuration information indicates a radio resource set for use by the radio communication node to perform communication with a terminal device, a radio resource in the radio resource set comprises at least one of a time domain resource or a frequency domain resource;
    determining, by the radio communication node, a first radio resource set based on the resource configuration information; and
    sending, by the radio communication node, scheduling signaling indicating a first radio resource in the first radio resource set to the terminal device, wherein the radio communication node is one of N transmission points that communicate with the terminal device, the first radio resource set is one of N radio resource sets for use by the N transmission points to communicate with the terminal device respectively, the N radio resource sets are one to one correspondence to the N transmission points, the N radio resource sets do not intersect, and N is an integer.

2. The method according to claim 1, wherein
    the N radio resource sets further comprise a radio resource set for use by the base station to communicate with the terminal device, and the N transmission points comprises the base station.

3. The method according to claim 1, wherein the resource configuration information further indicates at least one of the following: configuration of a reference signal, configuration of a control channel, a correspondence between the radio resource and a bearer, scrambling code parameter configuration, or a node identifier of the radio communication node.

4. The method according to claim 1, further comprising:
    receiving a connection configuration parameter from the base station, wherein the connection configuration parameter comprises a physical layer configuration parameter and a medium access control (MAC) layer configuration parameter; and establishing a user plane connection with the terminal device according to the connection configuration parameter.

5. The method according to claim 1, wherein a cell identifier of the radio communication node is the same as a cell identifier of the base station.

6. The method according to claim 1, further comprising:
sending, by the base station, to the terminal device at least one piece of the following information: first identifier information, instruction information, second identifier information, third identifier information, or information about scrambling code parameter configuration, wherein
the first identifier information indicates correspondences between the N radio resource sets and reference signals used by the N transmission points, the instruction information is used for instructing the terminal device to receive a corresponding control channel according to a type of a control channel of the base station or radio communication node, the second identifier information indicates correspondences between the N radio resource sets and transmission channels and between the N radio resource sets and radio bearers or evolved packet switch (EPS) bearers in the N radio resource sets, the third identifier information indicates identifiers of the base station and the N transmission points, the information about scrambling code parameter configuration is used for instructing the terminal device to descramble a downlink reference signal or a downlink physical channel, or used for instructing the terminal device to scramble an uplink reference signal or an uplink physical channel.

7. The method according to claim 1, further comprising:
sending, by the base station, a first coordination request message to M1 radio communication nodes separately; and
in response to the first coordination request message, receiving, by the base station, information about a first configuration parameter from M2 radio communication nodes among the M1 radio communication nodes, wherein the first configuration parameter comprises at least one of the following:
a radio resource set of a radio communication node corresponding to the first configuration parameter, configuration of a reference signal, configuration of a control channel, a correspondence between a radio resource of a radio communication node corresponding to the first configuration parameter and a radio bearer, a correspondence between the radio resource in the radio resource set of the radio communication node corresponding to the received first configuration parameter and an EPS bearer, scrambling code parameter configuration, and a node identifier of the radio communication node corresponding to the received first configuration parameter; and
after receiving the information about the first configuration parameter from the M2 radio communication nodes, determining, by the base station, the N transmission points among the M2 radio communication nodes, wherein M1 and M2 are positive integers and M1≥M2≥N.

8. An apparatus, comprising:
at least one storage medium including executable instructions; and
at least one processor;
wherein the executable instructions, when executed by the at least one processor, cause the apparatus to:

receive resource configuration information from a base station, wherein the resource configuration information indicates a radio resource set for use by the apparatus to perform communication with a terminal device, a radio resource in the radio resource set comprises at least one of a time domain resource or a frequency domain resource;
determine a first radio resource set based on the resource configuration information; and
send scheduling signaling indicating a first radio resource in the first radio resource set to the terminal device, wherein
the apparatus is one of N transmission points that communicate with the terminal device, the first radio resource set is one of N radio resource sets for use by the N transmission points to communicate with the terminal device respectively, the N radio resource sets are one to one correspondence to the N transmission points, the N radio resource sets do not intersect, and N is an integer.

9. The apparatus according to claim 8, wherein
the N radio resource sets further comprise a radio resource set for use by the base station to communicate with the terminal device, and the N transmission points comprises the base station.

10. The apparatus according to claim 8, wherein
the resource configuration information further indicates at least one of the following: configuration of a reference signal, configuration of a control channel, a correspondence between the radio resource and a bearer, scrambling code parameter configuration, or a node identifier of the apparatus.

11. The apparatus according to claim 8, wherein the executable instructions, when executed by the at least one processor, cause the apparatus to:
receiving a connection configuration parameter from the base station, wherein the connection configuration parameter comprises a physical layer configuration parameter and a medium access control (MAC) layer configuration parameter; and
establishing a user plane connection with the terminal device according to the connection configuration parameter.

12. The apparatus according to claim 8, wherein
a cell identifier of the apparatus is the same as a cell identifier of the base station.

13. A communication system, comprises
a communication node; and
a base station, wherein
the communication node is configured to:
receive resource configuration information from the base station, wherein the resource configuration information indicates a radio resource set for use by the communication node to perform communication with a terminal device, a radio resource in the radio resource set comprises at least one of a time domain resource or a frequency domain resource;
determine a first radio resource set based on the resource configuration information; and
send scheduling signaling indicating a first radio resource in the first radio resource set to the terminal device, wherein
the communication node is one of N transmission points that communicate with the terminal device, the first radio resource set is one of N radio resource sets for use by the N transmission points to communicate with the terminal device respectively, the N radio resource sets are one to one correspondence to the N transmission points, the N radio resource sets do not intersect, and N is an integer;

the base station is configure to:
- determine the N radio resource sets; and
- send the resource configuration information to communication node.

14. The communication system according to claim 13, wherein
the N radio resource sets further comprise a radio resource set for use by the base station to communicate with the terminal device, and the N transmission points comprises the base station.

15. The communication system according to claim 13, wherein
the resource configuration information further indicates at least one of the following: configuration of a reference signal, configuration of a control channel, a correspondence between the radio resource and a bearer, scrambling code parameter configuration, or a node identifier of the communication node.

16. The communication system according to claim 13, wherein the communication node is configured to:
- receive a connection configuration parameter from the base station, wherein the connection configuration parameter comprises a physical layer configuration parameter and a medium access control (MAC) layer configuration parameter; and
- establishing a user plane connection with the terminal device according to the connection configuration parameter.

17. The communication system according to claim 13, wherein
a cell identifier of the communication node is the same as a cell identifier of the base station.

18. The communication system according to claim 13, wherein
the base station is further configured to:
send to the terminal device at least one piece of the following information: first identifier information, instruction information, second identifier information, third identifier information, or information about scrambling code parameter configuration, wherein
the first identifier information indicates correspondences between the N radio resource sets and reference signals used by the N transmission points, the instruction information is used for instructing the terminal device to receive a corresponding control channel according to a type of a control channel of the base station or radio communication node, the second identifier information indicates correspondences between the N radio resource sets and transmission channels and between the N radio resource sets and radio bearers or evolved packet switch (EPS) bearers in the N radio resource sets, the third identifier information indicates identifiers of the base station and the N transmission points, the information about scrambling code parameter configuration is used for instructing the terminal device to descramble a downlink reference signal or a downlink physical channel, or used for instructing the terminal device to scramble an uplink reference signal or an uplink physical channel.

19. The communication system according to claim 13, wherein the base station is further configured to:
- determine the N transmission points according to a measurement report from the terminal device, wherein the measurement report comprises at least one of the following: signal strength of the N transmission points and signal quality of the N transmission points; or
- determine the N transmission points according to one or more of a moving speed of the terminal device, load of the N transmission points, a quality of service (QoS) parameter of the terminal device, and service information of the terminal device; or
- determine the N transmission points according to a stored access record of the terminal device, wherein the access record comprises at least one of an access frequency of the terminal device or a closed subscriber group (CSG) cell of the terminal device.

20. The communication system according to claim 13, wherein the base station is further configured to:
- establish a radio resource control (RRC) connection with the terminal device; and
- send a connection configuration parameter of the terminal device to the terminal device and the N transmission points separately, wherein the connection configuration parameter is used for the terminal device to establish a user plane connection with the N transmission points separately, and the connection configuration parameter comprises a physical layer configuration parameter and a medium access control (MAC) layer configuration parameter.

21. The communication system according to claim 13, wherein the base station is further configured to:
- send a first coordination request message to M1 radio communication nodes separately; and
- in response to the first coordination request message, receive information about a first configuration parameter from M2 radio communication nodes among the M1 radio communication nodes, wherein the first configuration parameter comprises at least one of the following:
  - a radio resource set of a radio communication node corresponding to the first configuration parameter, configuration of a reference signal, configuration of a control channel, a correspondence between a radio resource of a radio communication node corresponding to the first configuration parameter and a radio bearer, a correspondence between the radio resource in the radio resource set of the radio communication node corresponding to the received first configuration parameter and an EPS bearer, scrambling code parameter configuration, and a node identifier of the radio communication node corresponding to the received first configuration parameter; and
- after receiving the information about the first configuration parameter from the M2 radio communication nodes, determine the N transmission points among the M2 radio communication nodes, wherein M1 and M2 are positive integers and $M1 \geq M2 \geq N$.

* * * * *